United States Patent
Thepie Fapi et al.

(10) Patent No.: US 12,513,182 B2
(45) Date of Patent: Dec. 30, 2025

(54) MODELING OF ADVERSARIAL ARTIFICIAL INTELLIGENCE IN BLIND FALSE DATA INJECTION AGAINST AC STATE ESTIMATION IN SMART GRID SECURITY, SAFETY AND RELIABILITY

(71) Applicant: Telefonaktiebolaget LM Ericsson (publ), Stockholm (SE)

(72) Inventors: Emmanuel Thepie Fapi, Cote-Saint-Luc (CA); Moshfeka Rahman, Montreal (CA); Jun Yan, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 56 days.

(21) Appl. No.: 18/708,700

(22) PCT Filed: Nov. 11, 2021

(86) PCT No.: PCT/IB2021/060429
§ 371 (c)(1),
(2) Date: May 9, 2024

(87) PCT Pub. No.: WO2023/084279
PCT Pub. Date: May 19, 2023

(65) Prior Publication Data
US 2025/0023902 A1    Jan. 16, 2025

(51) Int. Cl.
*H04L 9/40* (2022.01)
*G06N 3/09* (2023.01)
*G06N 3/094* (2023.01)

(52) U.S. Cl.
CPC ........... *H04L 63/1433* (2013.01); *G06N 3/09* (2023.01); *G06N 3/094* (2023.01)

(58) Field of Classification Search
CPC ....... H04L 63/1433; G06N 3/09; G06N 3/094
See application file for complete search history.

(56) References Cited

U.S. PATENT DOCUMENTS

| | | | |
|---|---|---|---|
| 11,983,271 B2 * | 5/2024 | dos Santos Silva | G06N 3/08 |
| 2021/0157912 A1 * | 5/2021 | Kruthiveti Subrahmanyeswara Sai | G06F 21/554 |
| 2022/0156376 A1 * | 5/2022 | dos Santos Silva | G06F 21/554 |
| 2022/0309229 A1 * | 9/2022 | Walters | G06N 3/08 |
| 2022/0335335 A1 * | 10/2022 | Basak | G06F 21/54 |

(Continued)

OTHER PUBLICATIONS

International Search Report and Written Opinion dated Jul. 11, 2022 for International Application No. PCT/IB2021/060429 filed Nov. 11, 2021, consisting of 9 pages.

(Continued)

*Primary Examiner* — Chau Le
(74) *Attorney, Agent, or Firm* — Weisberg I.P. Law, P.A.

(57) ABSTRACT

Computer-implemented methods and systems for training an adversarial neural network to simulate a stealthy blind false data injection attack on a cyber physical system are provided. Supervised learning is used to generate an initial attack vector, by an adversarial attack generation model, based on inferred grid topology and historical measurements. A final attack vector is generated, by an adversarial verification model, based on a filtered subset of the initial attack vector utilizing a substitute bad data detection threshold, wherein the final attack vector enables creation of a counter measure.

20 Claims, 10 Drawing Sheets

(56) References Cited

U.S. PATENT DOCUMENTS

2023/0386044 A1* 11/2023 Kundeti ............... G06T 7/11
2025/0094571 A1* 3/2025 Taghia ............... G06F 21/554

OTHER PUBLICATIONS

E. Wang et al.; Security Issues and Challenges for Cyber Physical System; 2010 IEEE/ACM International Conference on Green Computing and Communications & 2010 IEEE/ACM International Conference on Cyber, Physical and Social Computing; Dec. 2010, consisting of 6 pages.

A. Rahman et al.; False Data Injection Attacks Against Nonlinear State Estimation in Smart Power Grids; 2013 IEEE Power & Energy Society General Meeting; Jul. 2013, consisting of 5 pages.

A. Sargolzaei et al.; Detection and Mitigation of False Data Injection Attacks in Networked Control Systems; IEEE Transactions on Industrial Informatics, vol. 16, No. 6; Jun. 2020, consisting of 12 pages.

M. Hossain et al.; Cyber-physical security for on-going smart grid initiatives: a survey; IET Cyber-Physical Systems: Theory & Applications; IET Journals: The Institution of Engineering and Technology; vol. 5, Issue 3; Jul. 22, 2020, consisting of 12 pages.

H. He et al.; Cyber-Physical Attacks and Defenses in the Smart Grid: a survey; IET Cyber-Physical Systems: Theory & Applications; Dec. 1, 2016, consisting of 34 pages.

M. Esmalifalak et al.; Stealth False Data Injection using Independent Component Analysis in Smart Grid; Cyber and Physical Security and Privacy ; 2011 IEEE International Conference on Smart Grid Communications (IEEE SmartGridComm); Oct. 2011, consisting of 5 pages.

A. Anwar et al.; Modelling and Performance Evaluation of Stealthy False Data Injection Attacks on Smart Grid in the Presence of Corrupted Measurements; arXiv; May 20, 2016, consisting of 20 pages.

Z.H. Yu et al.; Blind False Data Injection Attack Using PCA Approximation Method in Smart Grid; IEEE Transactions on Smart Grid, vol. 6, No. 3; May 2015, consisting of 8 pages.

W.L.Chin et al.; Blind False Data Attacks Against AC State Estimation Based on Geometric Approach in Smart Grid Communications; IEEE Transactions on Smart Grid; vol. 9, No. 6; Nov. 2018, consisting of 9 pages.

B. Tang et al.; Detection of False Data Injection Attacks in Smart Grid under Colored Gaussian Noise; 2016 IEEE Conference on Communications and Network Security (CNS); Oct. 2016, consisting of 8 pages.

R.D. Zimmerman et al.; MATPOWER: Steady-State Operations, Planning, and Analysis Tools for Power Systems Research and Education; IEEE Transactions on Power Systems; vol. 26, No. 1; Feb. 2011, consisting of 8 pages.

M. Ozay et al.; Sparse Attack Construction and State Estimation in the Smart Grid: Centralized and Distributed Models; IEEE Journal on Selected Areas in Communications; vol. 31, No. 7; Jul. 2013, consisting of 13 pages.

H. Zhong et al.; A Novel Sparse False Data Injection Attack Method in Smart Grids with Incomplete Power Network Information; Hindawi Complexity; vol. 2018, Article ID 8503825; 2018, consisting of 17 pages.

H. Margossian et al.; Partial grid false data injection attacks against state estimation; International Journal of Electrical Power & Energy Systems; vol. 110; Sep. 2019, consisting of 7 pages.

A. Sawas et al.; Two-fold Intelligent Approach for Successful FDI Attack on Power Systems State Estimation; 2018 IEEE Electrical Power and Energy Conference (EPEC); Oct. 2018, consisting of 6 pages.

J. Liang et al.; Cyber Attacks on AC State Estimation: Unobservability and Physical Consequences; 2014 IEEE PES General Meeting/ Conference & Exposition; Jul. 2014, consisting of 5 pages.

M.F. Moller; A Scaled Conjugate Gradient Algorithm for Fast Supervised Learning; Neural Networks, vol. 6, Issue 4; 1993, consisting of 9 pages.

M. Ashrafuzzaman et al.; Detecting Stealthy False Data Injection Attacks in the Smart Grid using Ensemble-based Machine Learning; ScienceDirect; Elsevier Computers & Security, vol. 97; Oct. 2020, consisting of 21 pages.

J. Li et al.; Toward Adversarial-Resilient Deep Neural Networks for False Data Injection Attack Detection in Power Grids; arXiv; Feb. 17, 2021, consisting of 12 pages.

M. Rahman et al.; Finding the Worse Case: Undetectable False Data Injection with Minimized Knowledge and Resource; 2019 IEEE Global Communications Conference (GLOBECOM); Dec. 2019, consisting of 7 pages.

O. Boyaci et al.; Graph Neural Networks Based Detection of Stealth False Data Injection Attacks in Smart Grids; arXiv; Oct. 10, 2021, consisting of 12 pages.

M. Rahman et al.; Multi-Objective Evolutionary Optimization for Worst-Case Analysis of False Data Injection Attacks in the Smart Grid; 2020 IEEE Congress on Evolutionary Computation (CEC); Jul. 2020, consisting of 8 pages.

* cited by examiner

MODELING OF ADVERSARIAL ARTIFICIAL INTELLIGENCE IN BLIND FALSE DATA INJECTION AGAINST AC STATE ESTIMATION IN SMART GRID SECURITY, SAFETY AND RELIABILITY

CROSS-REFERENCE TO RELATED APPLICATIONS

This application is a Submission Under 35 U.S.C. § 371 for U.S. National Stage Patent Application of International Application Number: PCT/IB2021/060429, filed Nov. 11, 2021 entitled "MODELING OF ADVERSARIAL ARTIFICIAL INTELLIGENCE IN BLIND FALSE DATA INJECTION AGAINST AC STATE ESTIMATION IN SMART GRID SECURITY, SAFETY AND RELIABILITY," the entirety of which is incorporated herein by reference.

TECHNICAL FIELD

The disclosure relates to artificial intelligence security in smart grids.

BACKGROUND

Cyber physical systems such as smart grids have become a vital aspect of our modern lives. Today, an electricity disruption such as a blackout can have a devastating effect on mission-critical operations in hospitals, prisons, banks, communications, traffic, and security systems. In recent years cyber-attacks on cyber physical systems, particularly on smart grids, have been on the rise.

Security in the cyber physical system is a relatively new area and is a critical and complex task. The smart grid is arguably one of the most complex cyber physical systems. This is due to the nature of the architecture design where data, processing, and communication channels are combined.

The smart grid incorporates several computing and communication devices, smart meters, and real-time control of electric network components that facilitate real-time communication between the various components. These components monitor power usage, report measurements to the centralized computer, and estimate the power grid state through analysis of meter measurements and power system models. A state estimator is a central part of every control center and state estimation is the main function for monitoring power networks. The smart grid heavily relies on state estimation for operations, including obtaining data or measurements across the electric grid which include topology, power flow parameters and data errors and determining appropriate control commands based on the same. Smart grid network operation relies on state estimation to perform analysis of the network under the conditions characterized by the current set of measurements.

A common cyber-attack on smart grids is a false data injection attack against state estimation, which has been known to damage the grid and user equipment, among other detrimental consequences. An adversary or an attacker launching a false data injection attack injects false measurements, for example, compromising the readings of grid sensors and phasor measurement units, thereby changing the results of state estimation, which in turn compromises system control and function.

Existing solutions rely on bad data detection mechanisms for thwarting false data injection attacks.

SUMMARY

While the solutions described above filter some abnormally noisy measurements, such mechanisms fail to detect and remove stealthy false data injections designed by modern cyber attackers without any topology knowledge. Cyber adversaries leveraging the power of artificial intelligence (AI) present new security challenges to cyber physical systems. Therefore, a solution is needed for addressing AI-implemented blind false data injection attacks. Embodiments solve the above technical problem and provide a technical solution of using neural networks and, more specifically, artificial neural networks, to detect false data injections in a cyber physical system.

To address these challenges, the disclosure includes methods and systems for training an adversarial neural network to simulate a stealthy blind false data injection attack on a cyber physical system.

The disclosure includes a computer-implemented method for training an adversarial neural network to simulate a stealthy blind false data injection attack on a cyber physical system. The method comprises using supervised learning to generate an initial attack vector, by an adversarial attack generation model, based on inferred grid topology and historical measurements. The method further comprises generating a final attack vector, by an adversarial verification model, based on a filtered subset of the initial attack vector utilizing a substitute bad data detection threshold, wherein the final attack vector enables creation of a counter measure.

The method further comprises using supervised learning, by the adversarial attack generation model, to generate a mapping representing the inferred grid topology. The method further comprises obtaining pseudo-estimated measurements from the adversarial neural network utilizing a subset of the historical measurements as input. The method further comprises classifying, by the adversarial verification model, data in the initial attack vector into abnormal data and malicious data.

The disclosure includes a non-transitory computer readable medium or media containing instructions for executing a method for training an adversarial neural network to simulate a stealthy blind false data injection attack on a cyber physical system. The method comprises using supervised learning to generate an initial attack vector, by an adversarial attack generation model, based on inferred grid topology and historical measurements. The method further comprises generating a final attack vector, by an adversarial verification model, based on a filtered subset of the initial attack vector utilizing a substitute bad data detection threshold, wherein the final attack vector enables creation of a counter measure.

The disclosure includes a system for training an adversarial neural network to simulate a stealthy blind false data injection attack on a cyber physical system comprising a database connected to a network and one or more processors and memory. The database is configured for receiving and storing historical measurements and attack vectors. The memory comprises instructions executable by the one or more processors whereby the system is operative to use supervised learning to generate an initial attack vector, by an adversarial attack generation model, based on inferred grid topology and historical measurements and generate a final attack vector, by an adversarial verification model, based on a filtered subset of the initial attack vector utilizing a substitute bad data detection threshold, wherein the final attack vector enables creation of a counter measure.

BRIEF DESCRIPTION OF THE DRAWINGS

Exemplary embodiments will be described with references to the accompanying figures, wherein.

Figure 1:
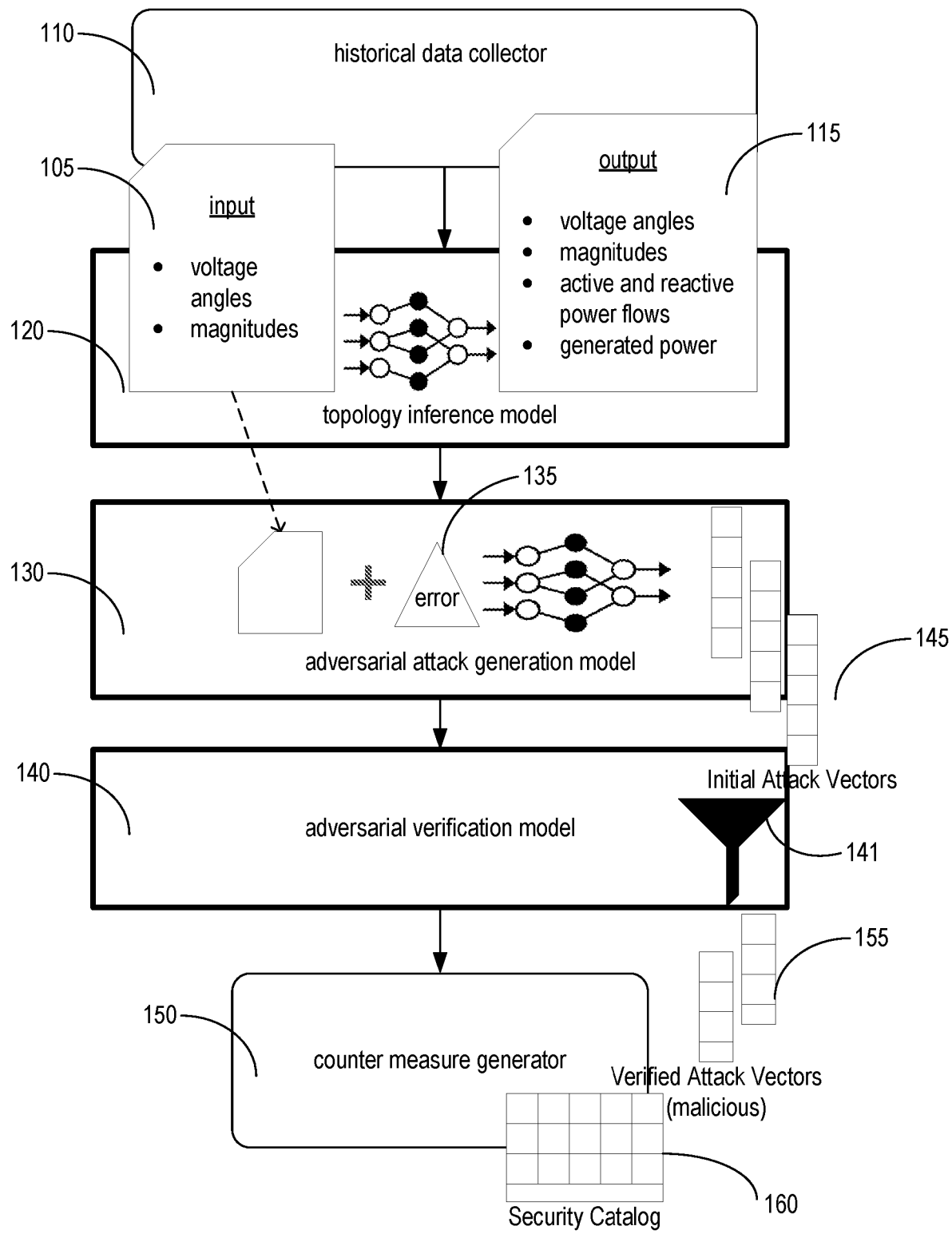
FIG. 1 is a block diagram showing components of a system for training an adversarial neural network to simulate a stealthy blind false data injection attack on a cyber physical system in accordance with some embodiments.

While the concept is described with reference to the above drawings, the drawings are intended to be illustrative, and the disclosure contemplates other embodiments within the spirit of the concept.

DETAILED DESCRIPTION

The concept will now be described more fully hereinafter with reference to the accompanying drawings which show, by way of illustration, specific embodiments by which the invention may be practiced. The concept may, however, be embodied in many different forms and should not be construed as limited to the embodiments set forth herein; rather, these embodiments are provided so that this disclosure will be thorough and complete, and will fully convey the scope of the invention to those skilled in the art. Among other things, the concept may be embodied as devices or methods. Accordingly, the concept may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrases "in one embodiment," "in an embodiment," and the like, as used herein, does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the concept.

In addition, as used herein, the term "or" is an inclusive "or" operator and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" includes plural references. The meaning of "in" includes "in" and "on."

It is noted that description herein is not intended as an extensive overview, and as such, concepts may be simplified in the interests of clarity and brevity. Any process described in this application may be performed in any order and may omit any of the steps in the process. Processes may also be combined with other processes or steps of other processes.

The disclosure generally relates to systems and methods for training an adversarial artificial neural network to simulate a stealthy blind false data injection attack on a cyber physical system. While the embodiments described herein are primarily described with respect to cloud networks operating in 5G, the disclosure is also applicable to other types of networks and existing technologies such as Global System for Mobile Communications (GSM), third generation of wireless mobile telecommunications technology (3G), fourth generation of wireless mobile telecommunications technology (4G) long term evolution (LTE) and other future technologies, such as 6G networks and beyond.

Machine learning approaches are superior to other smart grid security approaches for being able to infer smart grid topology from a fraction of actual grid topology knowledge. Machine learning (ML) models according to some embodiments, are powerful and computationally complex. Cloud networking and 5G infrastructure deployment according to some embodiments provides important advantages such as improving security and scalability, while saving resources including bandwidth, energy, memory space, processing power, and time.

In some embodiments, the systems and methods for training an adversarial neural network to simulate a stealthy blind false data injection attack on a cyber physical system provide developers and designers of a physical cyber system with improved security tools. For example, the artificial intelligence/machine learning (AI/ML) false data injection detection model facilitates refined evaluation and approach related to cyber-attacks.

In some embodiments, the systems and methods for training an adversarial neural network to simulate a stealthy blind false data injection attack on a cyber physical system, effectively secure the power grid by using only a fraction of the knowledge of the cyber physical infrastructure. In some embodiments, the AI/ML false data injection detection model design facilitates attack prediction generation, providing anticipated knowledge.

In some embodiments, the AI/ML false data injection detection model relies on at least one of alternating current (AC) state estimation, direct current (DC) state estimation, or a combination of both. In some embodiments, DC (linear) state estimation is a simplified version of AC (nonlinear) state estimation. In some embodiments, DC (linear) state estimation is obtained in closed form, and AC (nonlinear) state estimation is obtained through iterations.

In some embodiments, DC (linear) state estimation is based on active power flow analysis, and AC (nonlinear) state estimation is based on both active and reactive power flow analysis. In some embodiments, DC (linear) state estimation utilizes voltage phase angles for state variables, and AC (nonlinear) state estimation utilizes both voltage phase angles and magnitudes for state variables. In some embodiments, DC (linear) state estimation utilizes linear equations producing a less accurate but more robust model, and AC (nonlinear) state estimation utilizes nonlinear equations resulting in a more accurate and computationally extensive model.

While the embodiments described below are primarily described with respect to AC state estimation, the disclosure is also applicable to DC state estimation, and other estimations related to control of a physical cyber system.

The AI/ML false data injection detection model according to some embodiments, facilitates developing specifications, guidelines and standards utilized in cyber physical system risk assessment and security requirements for critical systems. An adversarial artificial neural network facilitates adapting to new attacks and anticipating future attacks by cyber criminals. The AI/ML false data injection detection model may provide the ability to the cyber physical system (CPS) to deal with corrupted data and act on it conveniently.

The AI/ML false data injection detection model according to some embodiments facilitates deployment as a risk assessment framework to analyze the threats and vulnerabilities that may compromise or damage the cyber physical system. The AI/ML false data injection detection model according to some embodiments facilitates organizational improvement of cybersecurity attitudes since the rate at which new threats develop and frequency of attacks are on the rise.

The AI/ML false data injection detection model according to some embodiments provides capability for refining the attack model and modulating the attack strength.

The AI/ML false data injection detection model according to some embodiments facilitates a comprehensive understanding of how an adversarial artificial neural network is evolving behind complex interconnected and coupled Cyber Physical Systems. The AI/ML false data injection detection model enables security experts to understand various dynamics of a cyber environment to detect abnormal activities.

The AI/ML false data injection detection model according to some embodiments facilitates lessening the undesirable impact of cyber-attacks and developing improved prevention and recovery methods. In some embodiments, the AI/ML false data injection detection model is integrated as testbed utilized in revising, optimizing and developing security mechanisms, including for example anomaly detection and intrusion detection mechanisms.

The AI/ML false data injection detection model according to some embodiments is configured utilizing a 5G networking layer in the cyber physical system, where the model is deployed on the cloud and set as the distributed cyber physical system security orchestrator. In some embodiments, several distributed cyber physical systems share the same 5G networking infrastructure, where the model is deployed in a continuous training, continuous evaluation, and continuous update of the cyber physical systems. In some embodiments, the cloud-based model operates as a controlled virtual attacker producing data and knowledge customized to the cyber physical system to be used in refining and updating security systems.

In some embodiments, the systems and methods for training an adversarial neural network to simulate a stealthy blind false data injection attack on a cyber physical system and the corresponding AI/ML false data injection detection model is deployed in the cloud as a service. In some embodiments, the cloud service is available via a subscription, utilized for example by cyber physical systems, developers and researchers. In some embodiments, the subscription provides support for at least one of cyber physical system security development phase, testing phase, acceptance phase, deployment phase, production phase and update phase.

FIG. 1 is a block diagram showing components of a system for training an adversarial neural network to simulate a stealthy blind false data injection attack on a cyber physical system in accordance with some embodiments.

Referring to FIG. 1, in some embodiments, AI/ML blind false data injection (BFDI) detection system 100 includes historical data collector 110, topology inference model 120, adversarial attack generation model 130, adversarial verification model 140 and counter measure generator 150.

Historical data collector 110 collects measurement data such as voltage angles, magnitudes, active and reactive power flows, and generated power, among others, which is used for input 105 and output 115 to train the adversarial artificial neural network to generate topology inference model 120. In some embodiments, at least 200 error-free noise-free measurements are used to train the artificial neural network on the forward pass during the inference stage.

In some embodiments, 60 parameters are used as input and 284 parameters as output. For example, for the Institute of Electrical and Electronics Engineers (IEEE) 30-bus system, the 284 measurement includes voltage angle, voltage magnitude, bus real power generation, bus reactive power generation, bus real power injection, bus reactive power injection, bus real power withdrawn, and bus reactive power withdrawn. Out of the 284 measurements, 30 voltage angle and 30 voltage magnitude measurements are used as input. Therefore, for each set of measurement vectors, there are 284 measurements.

In some embodiments, the state estimation function $z=h(\hat{x})$, indicates that the states ($\hat{x}$) are mapped into the measurements ($z$), using topology function ($h(\cdot)$). Thus, measurements $z_x$, which are measurements for voltage angles and magnitudes, are used as input and all the measurements ($z$) as output, to infer the mapping function using the artificial neural network (ANN).

Trained topology inference model 120 is then used to generate initial attack vectors 145, by using input 105 and error 135 as input. Adversarial verification model 140 is then used to filter the initial attack vectors 145, removing bad data, to produce verified attack vectors 155, including malicious data. Filter 141 uses a bad data detection threshold to remove bad data from the initial attack vectors 145. The filtering is performed until no bad data remains. Removing bad data from the attack vector increases the stealth strength of the data and compensates for any potential incorporated false data as part of the normal operation of a cyber physical system.

In some embodiments, error 135, which is the intended state error or intended state deviation, is generated using a random Gaussian distribution function. The normal noise associated with the measurements is of Gaussian nature. Thus, to bypass the BDD the attacker attempts to inject deviation or error into the measurement, such that the injection follows the same Gaussian distribution.

In some embodiments, error 135 includes the intended deviation or error (c) to the voltage angle and magnitude. That is, error 135 is the deviation the attacker wants to inject and is generated using a Gaussian distribution function. The c is then injected to the voltage angle and magnitude measurements ($z_x$) to obtain $z'_x = z_x + c$. The $z'_x$ is then used as an input to the trained ANN. The output of the trained ANN is the initial attack vector 145 denoted by ($z_a$) and expressed as $z_a = h_{nn}(z'_x)$.

Verified attack vectors 155, may be used by counter measure generator 150 to produce a counter measure against a data injection attack using these vectors 155. As one example, a counter measure may include compiling a security catalog 160 which stores the verified attack vectors for security purposes.

Figure 2:
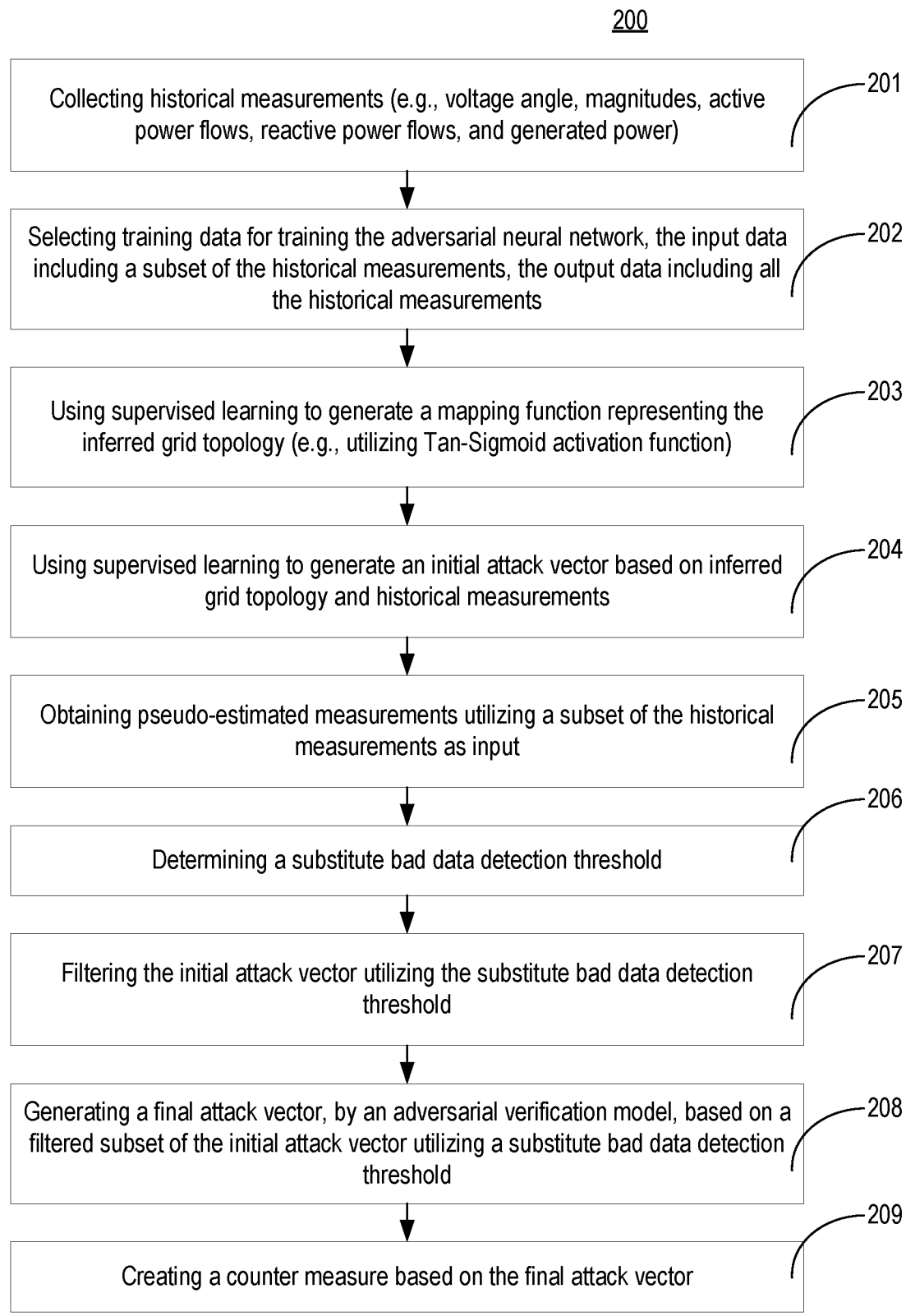
FIG. 2 is a flow chart for training an adversarial neural network to simulate a stealthy blind false data injection attack on a cyber physical system in accordance with some embodiments.

FIG. 2 is a flow chart for training an adversarial neural network to simulate a stealthy blind false data injection attack on a cyber physical system in accordance with some embodiments. Artificial neural networks are effective at approximating unknown functions that depend on many inputs. In some embodiments, "function" refers to any operation that maps inputs to outputs.

Referring to FIG. 2, in some embodiments, method 200 starts with step 201. At step 201, the AI/ML BFDI detection model collects historical measurements over a period of time (e.g., voltage angle, magnitudes, active power flows, reactive power flows, and generated power). In some embodiments, the historical measurements include error-free and noise-free measurements.

At step 202, the AI/ML BFDI detection model selects training data for training the adversarial neural network, the input data including a subset of the historical measurements, the output data including all of the historical measurements collected over a period of time. In some embodiments, the subset includes the measurements of the voltage angle and voltage magnitude.

At step 203, the AI/ML BFDI detection model uses supervised learning to generate a mapping function representing the inferred grid topology (e.g., utilizing Tan-Sigmoid activation function). In some embodiments, utilizing the function approximation property of an artificial neural network AI/ML BFDI detection model uses collected historical measurements to infer topology of the cyber physical system. To train the network, AI/ML BFDI detection model uses a subset of the historical measurements, which may include, for example, the voltage angle and magnitude measurements. The outputs include measurements with all the parameters including, for example, voltage angles, magnitudes, active and reactive power flows, and generated power.

At step 204, the AI/ML BFDI detection model uses supervised learning to generate an initial attack vector based on inferred grid topology and historical measurements. The inferred topology $h_{nn}$ is then the mapping function between the inputs and the outputs, which is the trained ANN. The inferred topology $h_{nn}$ embedded in the trained network is used to generate the attack measurement $z_a$, determine the substitute BDD threshold $\tau_p$ and apply the substitute BDD filtering.

At step 205, the AI/ML BFDI detection model obtains pseudo-estimated measurements utilizing a subset of the historical measurements as input. In some embodiments, state estimation or pseudo-estimation may include pre-processing of raw measurements to reduce the influence of metering noise, sensor failure, and communication loss in the energy management system. State estimation or pseudo-estimation may be performed using iterative methods such as the Newton-Raphson, or the Gauss-Newton method, and the like.

In an embodiment, the ANN is leveraged to generate pseudo-estimated measurements from the historical measurements. Since historical measurements are used instead of the raw measurements from the sensors, these measurements are referred to as a "pseudo-estimation." The error between the pseudo-estimated measurements and the historical measurements is used to obtain the threshold of the substitute BDD.

At step 206, the AI/ML BFDI detection model determines a substitute bad data detection threshold.

At step 207, the AI/ML BFDI detection model filters the initial attack vector utilizing the substitute bad data detection threshold.

At step 208, the AI/ML BFDI detection model generates a final attack vector, by an adversarial verification model, based on a filtered subset of the initial attack vector utilizing a substitute bad data detection threshold.

At step 209, the AI/ML BFDI detection model creates a counter measure based on the final attack vector.

Figure 3:
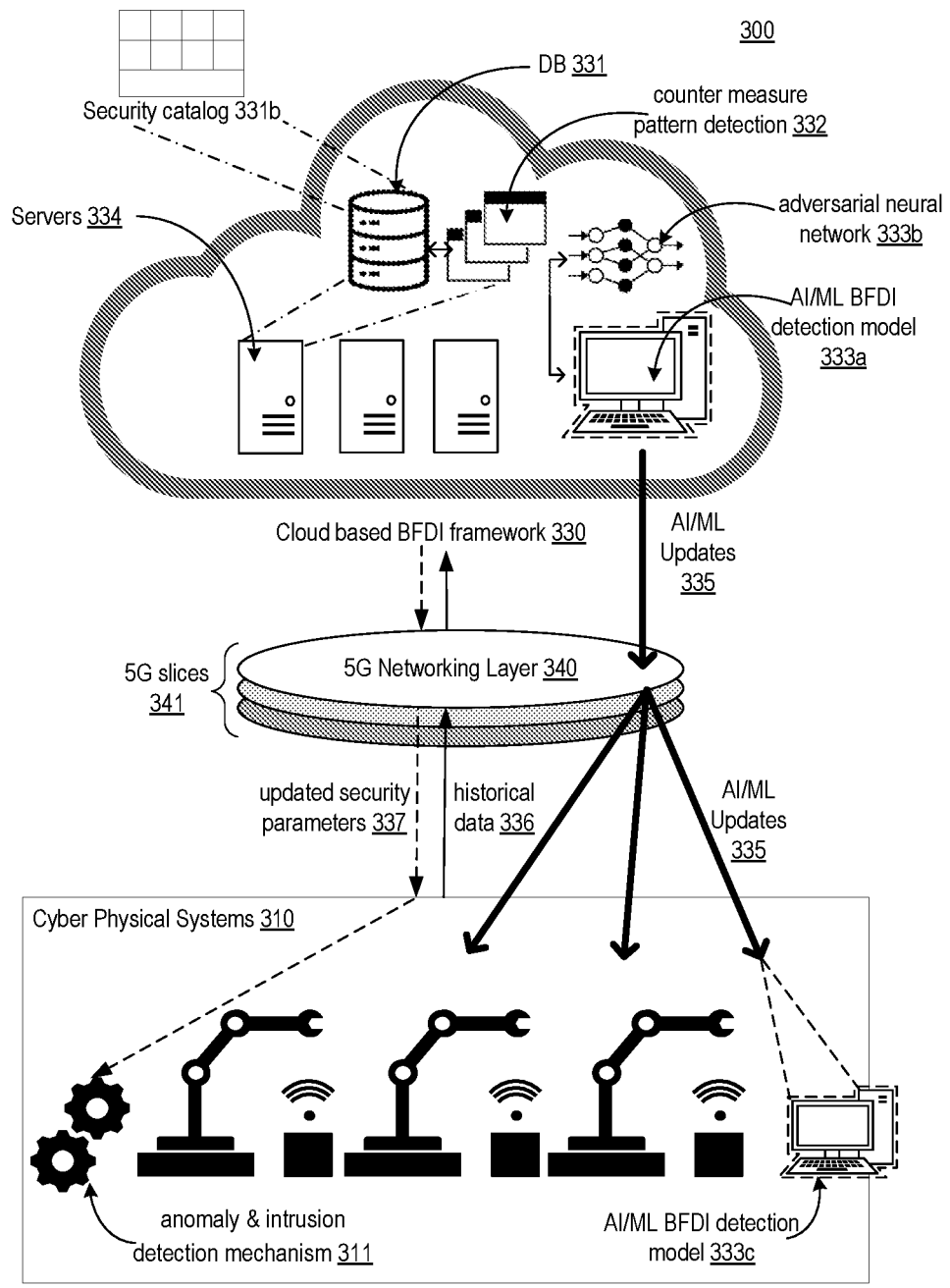
FIG. 3 is a block diagram showing components of a system for training an adversarial neural network to simulate a stealthy blind false data injection attack on a cyber physical system in accordance with some embodiments.

FIG. 3 is a block diagram showing components of a system for training an adversarial neural network to simulate a stealthy blind false data injection attack on a cyber physical system in accordance with some embodiments.

Referring to FIG. 3, in some embodiments, AI/ML BFDI detection system 300 is implemented as cloud-based BFDI framework 330, utilizing 5G networking layer 340. Cloud-based BFDI framework 330 includes AI/ML BFDI model 333a, adversarial neural network 333b, counter measure pattern detection 332, servers 334, database 331, and security catalog 331b. In some embodiments, security catalog 331b corresponds to security catalog 160.

In some embodiments, cloud-based BFDI framework 330 deployment is mapped to a customized 5G slice of a cyber physical system. The customized 5G slice of 5G slices 341 in 5G networking layer 340 provides connectivity and data processing tailored to the specific networking requirements of cloud based BFDI framework 330, for example as related to collecting historical data 336, updating security parameters 337 and AI/ML updates 335. In some embodiments, security updates are related to key performance indicators (KPIs) for the particular cyber-physical system, for example a synchronization error for a high quality of service.

The customized network capabilities provided for cloud based BFDI framework 330 include, but are not limited to, data speed, quality, latency, reliability, security, and services, among others. The customized 5G slice includes one or more slices from 5G slices 341 in 5G networking layer 340, each slice or combination of slices configured to facilitate saving resources including bandwidth, energy, memory space, processing power, and time.

In some embodiments, cloud-based BFDI framework 330 is mapped to a highly secure, reliable, and/or high latency slice providing optimal perpetual training, evaluation, and updates of the security systems deployed by cyber physical systems 310. For example, in some embodiments, anomaly and intrusion detection mechanism 311 relies on receiving timely and secure updated security parameters 337, and AI/ML BFDI detection model 333c relies on receiving timely and secure AI/ML updates 335. Thus, mapping cloud-based BFDI framework 330 to a custom 5G slice allows for real-time anomaly detection and scalability, despite the computational complexity of a neural network.

Software aspects of the cloud-based BFDI framework 330 are intended to broadly include or represent all programming, applications, algorithms, software and other tools necessary to implement or facilitate methods and systems according to embodiments of the invention. The elements of systems and methods for training an adversarial neural network to simulate a stealthy blind false data injection attack on a cyber physical system may exist on a single server computer or be distributed among multiple computers, servers 334, devices or entities, which can include cyber physical system operators, telecommunications, and data providers, etc. If the systems and methods for training an adversarial neural network to simulate a stealthy blind false data injection attack on a cyber physical system is distributed among multiple computers, servers, devices or entities, such multiple computers would communicate, for example, as shown on FIG. 3.

Servers 334 can include a computing device capable of sending or receiving signals, e.g., via a wired or wireless network, and/or processing or storing signals, e.g., in memory as physical memory states. The server may be an application server that includes a configuration to provide one or more applications, e.g., aspects of the systems and methods for training an adversarial neural network to simulate a stealthy blind false data injection attack on a cyber physical system, via a network to another device. Also, an application server may, for example, host a Web site that can provide a user interface for administration of example aspects of the systems and methods for training an adversarial neural network to simulate a stealthy blind false data injection attack on a cyber physical system.

Any computing device capable of sending, receiving, and processing data over a wired and/or a wireless network may act as a server, such as in facilitating aspects of implementations of the systems and methods for training an adversarial neural network to simulate a stealthy blind false data injection attack on a cyber physical system. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example systems and methods for training an adversarial neural network to simulate a stealthy blind false data injection attack on a cyber physical system. One or more servers may, for example, be used in hosting a Web site. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, Hypertext Transfer Protocol (HTTP), secure Hypertext Transfer Protocol (HTTPS), Advanced Encryption Standard (AES) services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for training an adversarial neural network to simulate a stealthy blind false data injection attack on a cyber physical system. Content may include, for example, text, images, audio, video, and the like.

The system 300 of FIG. 3 enables connectivity between cyber physical systems 310, 5G networking layer 340, and cloud based BFDI framework 330. In that sense, the system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the 5G networking layer 340 includes a cellular network that implements 3GPP standardized features. Accordingly, 5G networking layer 340 may support network slicing to provide different logical networks to different devices that are connected to 5G networking layer 340. For example, 5G networking layer 340 may provide Ultra Reliable Low Latency Communication (URLLC) services to some cyber physical systems 310, while providing Enhanced Mobile Broadband (eMBB) services to other cyber physical systems 310, and/or Massive Machine Type Communication (mMTC)/Massive IoT services to yet further cyber physical systems 310.

In some examples, cyber physical systems 310 are configured to transmit and/or receive information without direct human interaction. For instance, a cyber physical system may be designed to transmit information to cloud-based BFDI framework 330 on a predetermined schedule, when triggered by an internal or external event, or in response to requests from cloud-based BFDI framework 330. Additionally, a cyber physical system may be configured for operating in single- or Multiple Radio Access Technology (multi-RAT) or multi-standard mode. For example, a cyber physical system may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In some embodiments, a virtual BFDI framework is implemented in a cloud-based architecture providing automated updates of security parameters of the smart grid once the cloud-based BFDI framework has designed potential stealthy attack vectors. Considered as "Virtual Attacker," the cloud-based implementation may enable update of cyber physical systems 310 defense systems. In some embodiments, defense systems include but are not limited to implementations utilizing anomaly and intrusion detection mechanism 311 and AI/ML BFDI detection model 333c. In some embodiments, counter measure patterns include anomaly detection, intrusion detection, signature-based security, and an AI/ML-implemented key performance indicator (KPI) deviation detection mechanisms. Adoption of AI/ML as a counter measure is an integrated part of some embodiments. If the cyber physical systems owner wants to update his bad data detection mechanism, the owner can rely on the cloud-based BFDI framework 330 to train and deploy an AI/ML model in a closed loop.

In some embodiments, cloud-based BFDI framework 330 is implemented in a cloud as a continuous training, continuous evaluation and continuous update of security systems of distributed cyber physical systems 310 over 5G and/or 5G slices 331.

Figure 4:
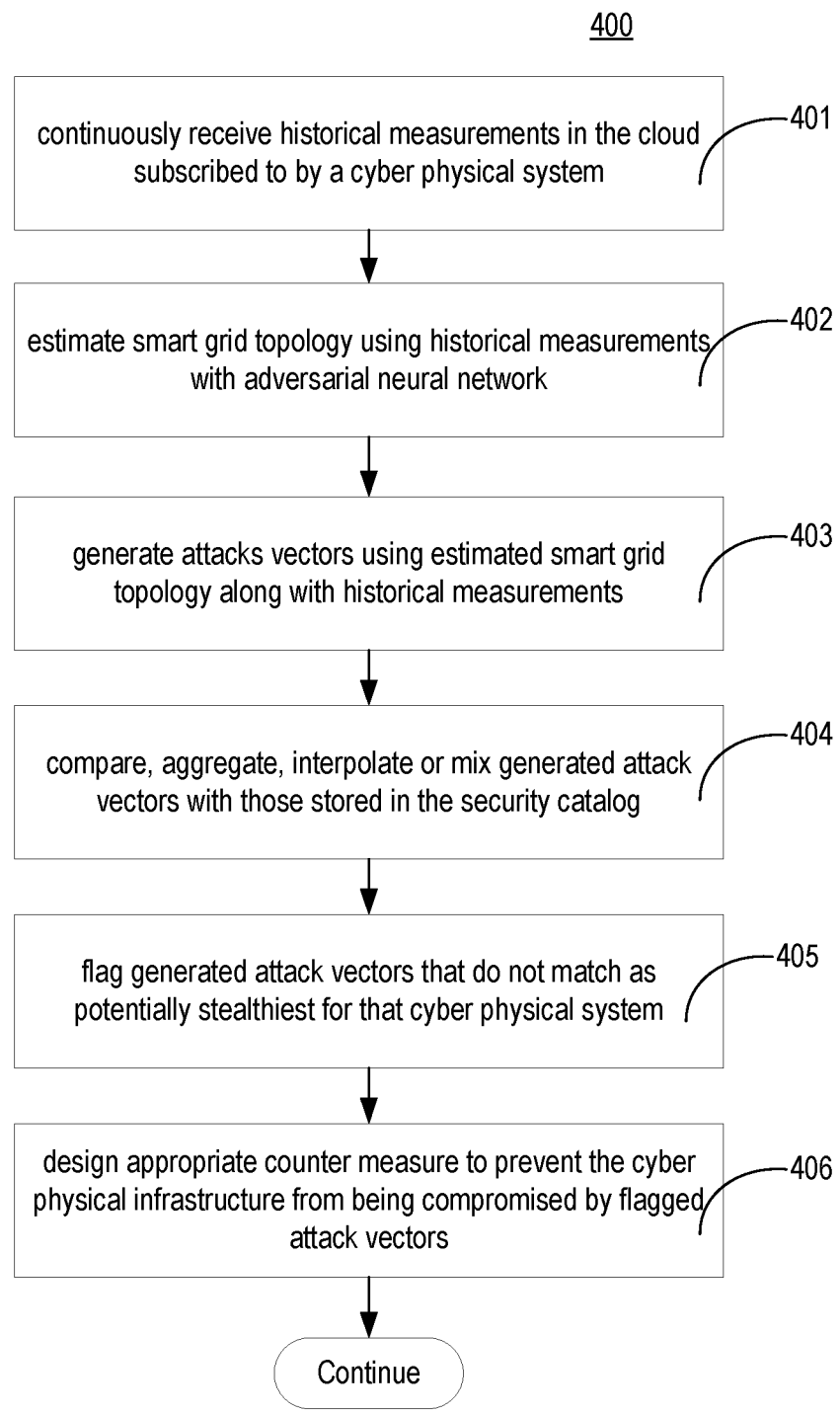
FIG. 4 is a flow chart for a cloud-implemented method for training the adversarial neural network to simulate a stealthy blind false data injection attack on a cyber physical system in accordance with some embodiments.

FIG. 4 is a flow chart for a cloud-implemented method for training the adversarial neural network to simulate a stealthy blind false data injection attack on a cyber physical system in accordance with some embodiments. In some embodiments, several distributed Cyber Physical Systems may or may not share the same networking 5G infrastructure. In some embodiments, the cloud implementation enables continuous training, continuous evaluation, and continuous system security updates of the security systems of distributed cyber physical system.

Referring to FIG. 4, in some embodiments, method 400 starts with step 401. At step 401, at a predetermined time, the cyber physical system sends the historical measurements to the cloud-based AI/ML BFDI detection model, in the cloud it has subscribed for, via the 5G network. In some embodiments, a predetermined time includes a given evaluation time, periodically at a particular time interval, or in real-time relative to generating the measurement in the cyber physical system. In some embodiments, the cyber physical system is equipped with a data collection solution which manages and stores historic measurements. In some embodiments, a database storing at least one of historical measurements, security parameters and attack vectors is located at the cloud level, is continuously updated with new data based on latest measurements and corresponding analysis and processing by the AI/ML BFDI detection model.

At step 402, the cloud-based AI/ML BFDI detection model uses historical measurements to approximate the current topology of the smart grid, using an adversarial neural network as described herein according to some embodiments.

At step 403, the cloud-based AI/ML BFDI uses the estimated smart grid topology along with the historical measurements to generate attack vectors described herein according to some embodiments.

At step 404, the cloud-based AI/ML BFDI compares, aggregates, interpolates or mixes the generated attack vectors with those stored in the security catalog.

At step 405, generated attack vectors that do not match (cannot be detected by the integrated BDD) are considered as potentially the stealthiest attack vectors for that cyber physical system. Thus, the cloud-based AI/ML BFDI acts as a virtual attacker controlled by the operators of the cyber physical system.

At step 406, the cloud-based AI/ML BFDI designs appropriate counter measures to prevent the cyber physical infrastructure from being compromised by the stealthiest attack vectors identified, leveraging a counter-measure pattern module. In some embodiments, the counter-measure pattern module includes a signature-based detection mechanism, an anomaly detection mechanism or intrusion detection mechanism.

Figure 5:
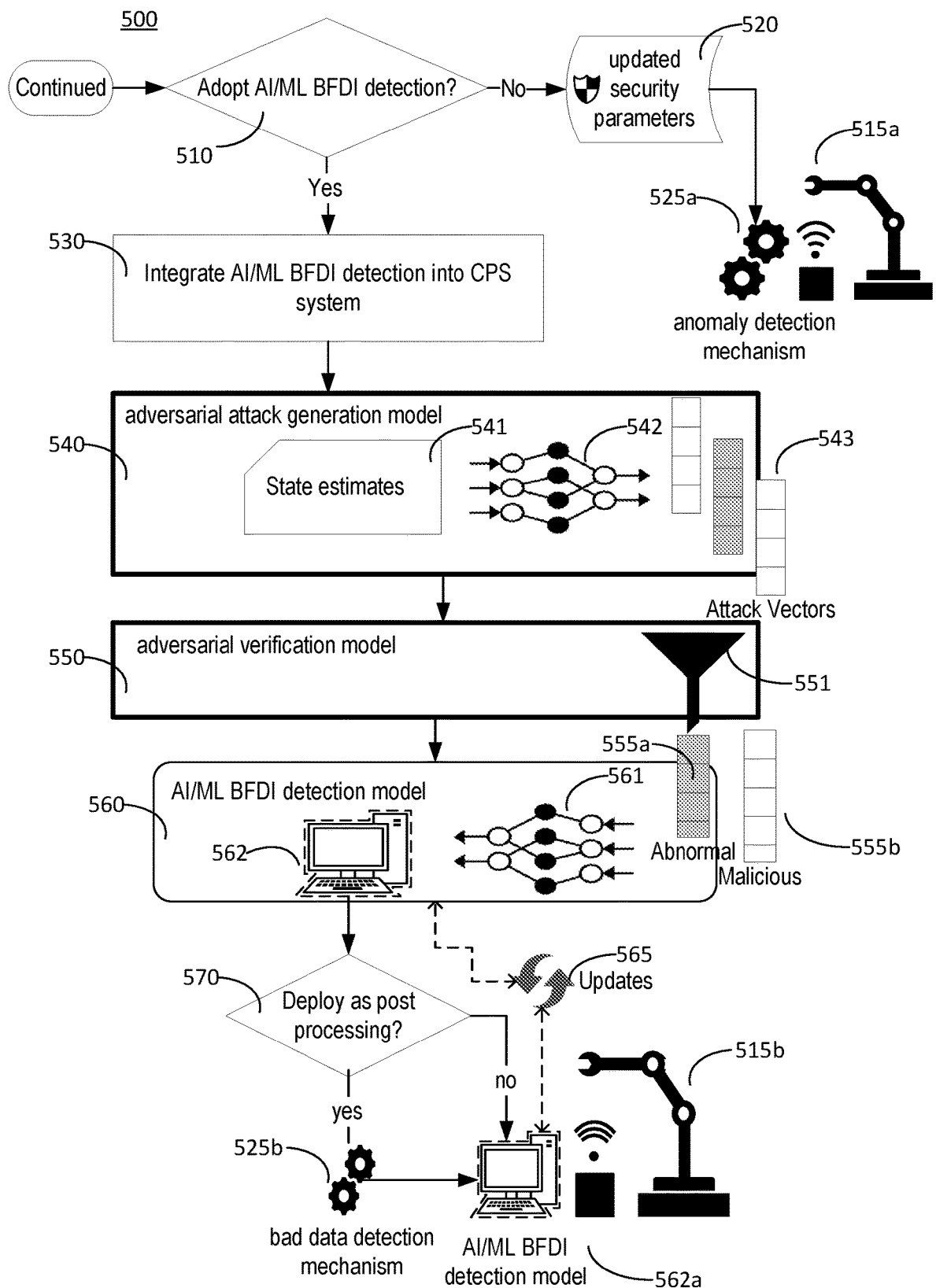
FIG. 5 is a block diagram showing components of a system for training an adversarial neural network to simulate a stealthy blind false data injection attack on a cyber physical system in accordance with some embodiments.

In some embodiments, method 400 continues in FIG. 5, where multiple options for deployment of the AI/ML BFDI detection model are shown.

FIG. 5 is a block diagram showing components of a system for training an adversarial neural network to simulate a stealthy blind false data injection attack on a cyber physical system in accordance with some embodiments.

Referring to FIG. 5, in some embodiments, AI/ML BFDI detection system 500 can be implemented and deployed in multiple ways, depending on preferences of CPS operators.

At decision point 510, CPS 515a and 515b decide whether to adopt the AI/ML BFDI detection model as a continuous training and evaluation system (yes), or a continuous update of security systems (no). That is, once the cloud-based AI/ML BFDI detection model has been implemented for a particular cyber physical system, there are at least two options for deployment, depending on whether the cyber physical system operator requests adoption of AI/ML for false data injection (FDI) detection.

CPS 515a chooses not to adopt the AI/ML BFDI detection model for FDI detection and will instead rely on BDD, in which case AI/ML BFDI detection system 500 sends updated security parameters 520 to CPS 515a. Updated security parameters 520 are applied using anomaly detection mechanism 525a. In some embodiments, security parameters 520 are applied using a different detection mechanism. In some embodiments, updated security parameters are utilized for automated security updates or self-update security deployments utilizing counter measure patterns. In some embodiments, counter measure patterns include anomaly detection, intrusion detection, signature-based security, and an AI/ML-implemented key performance indicator (KPI) deviation detection mechanisms.

CPS 515b chooses to adopt the AI/ML BFDI detection model, in which case AI/ML BFDI detection system 500 proceeds to integrate AI/ML BFDI detection into the CPS system. First, adversarial attack generation model 540 is created for CPS 515b, by training the neural network 542 with state estimates 541, to generate attack vectors 543. That is, AI/ML BFDI detection system 500 uses the estimated state to generate new attack vectors. In some embodiments, the state estimates 541 include at least one of a linear state estimation and a nonlinear state estimation.

Then, adversarial verification model 550 applies a filter 551 to the attack vectors 543 to produce two classes of data, abnormal vectors 555a and malicious vectors 555b. That is, after filtering, the estimated data is classified as abnormal data and malicious data. In some embodiments, abnormal data includes data that can bypass the BDD deployed in CPS 515b. In some embodiments, malicious data includes data that cannot be detected by the deployed BDD.

In some embodiments, normal data is data with white Gaussian noise. Bad data is data with abnormally high occurrence of noise that does not follow white Gaussian distribution. Malicious data is generated by an adversarial opponent for malicious benefit, and in this context the malicious data is exclusively comprised of false data that follows the Gaussian distribution to bypass the BDD. Therefore, if $z_0$ is original measurements from the sensors, and n is the Gaussian noise associated with the measurements, then normal data is denoted by $z=z_0+n$. On the other hand, if n' is abnormally large noise that does not follow the white Gaussian distribution, then according to the definition of the bad data it can be expressed as $z_b=z_0+n'$. Malicious attack data can be expressed as $z_a=z+a=(z_0+n)+a$.

Then AI/ML BFDI detection model 560 uses classified abnormal vectors 555a and malicious vectors 555b as input to train neural network 561 and produce a customized AI/ML BFDI detection model 562, ready for deployment to CPS 515b. That is, AI/ML BFDI detection model 560 uses the two classes of data to train an AI/ML model for a CPS.

At decision point 570, the CPS 515b may choose to implement AI/ML BFDI detection model 562 as its sole security measure (no), or deploy model 562 in post processing, after bad data detection mechanism 525b has been applied (yes). In either case, deployed AI/ML BFDI detection model 562a for CPS 515b may receive updates 565 periodically, for example updating security parameters for a deployed security mechanism and/or a deployed AI/ML BFDI detection model, the updates based on newly processed historical data collected from the corresponding CPS or from AI/ML analysis related to CPS security.

In some embodiments, periodic updates include at least one of an improved version of the BDD mechanism, an improved version of the deployed AI/ML BFDI detection model, security patch update information for out-of-date software or unpatched software, and security or system configuration settings, for example in the case of a system misconfiguration.

In other words, CPS 515b can exclusively rely on AI/ML BFDI detection model 562, and the standard bad data detection mechanism 525b is no longer needed. In this case, CPS 515b transitions from bad data detection mechanism 525b to AI/ML BFDI detection model 562. Alternatively, CPS 515b maintains bad data detection mechanism 525b. In this case, AI/ML BFDI detection model 562 is deployed as a post processing security measure after bad data detection mechanism 525b has filtered the input vector.

Figure 6:
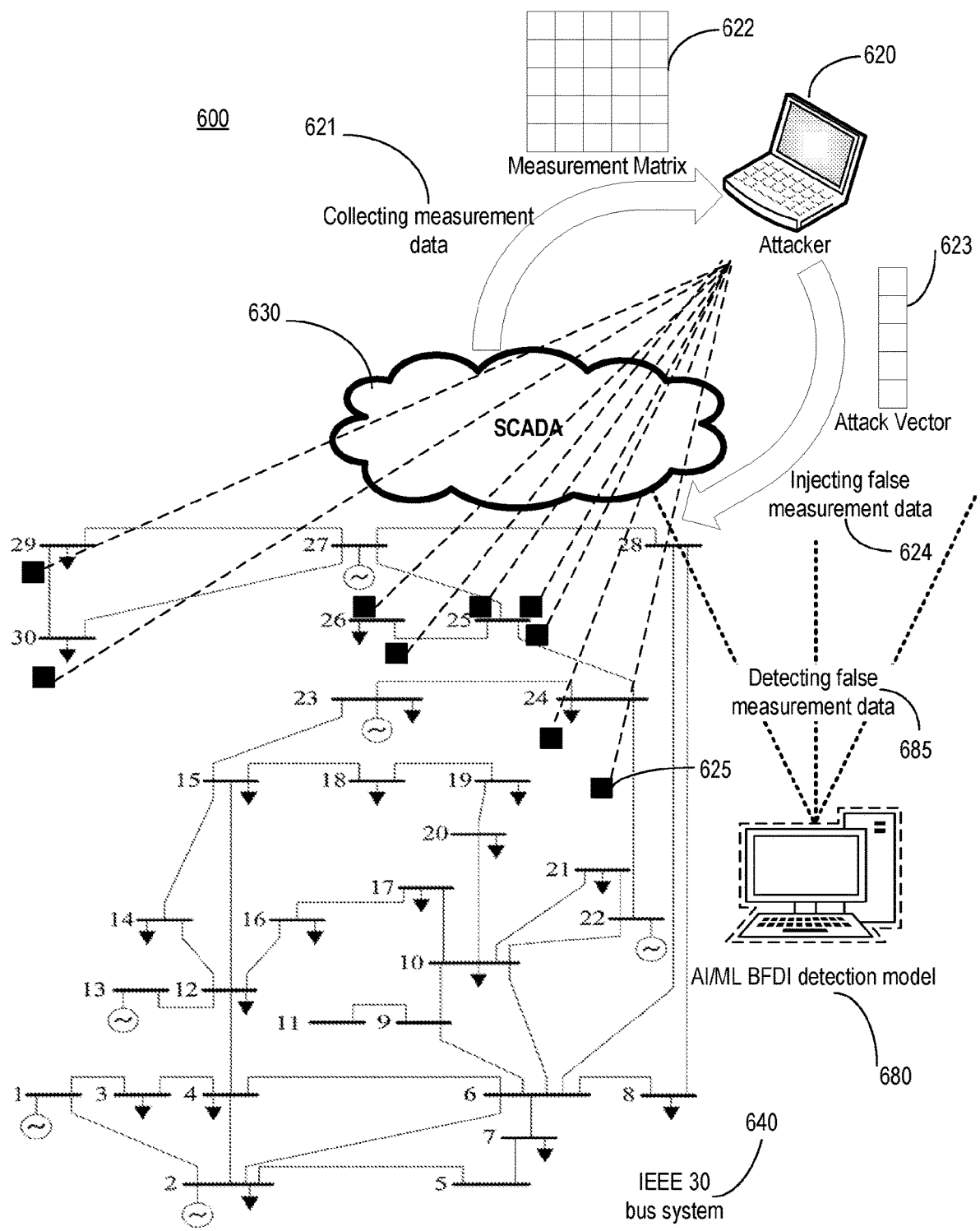
FIG. 6 is a block diagram showing components of a system for training an adversarial neural network to simulate a stealthy blind false data injection attack on a cyber physical system in accordance with some embodiments.

FIG. 6 is a block diagram showing components of a system for training an adversarial neural network to simulate a stealthy blind false data injection attack on a cyber physical system in accordance with some embodiments.

Referring to FIG. 6, in some embodiments, AI/ML BFDI detection system 600 facilitates detecting false data injection attacks. Attacker 620 collects measurement data 621 from Supervisory Control and Data Acquisition unit (SCADA) 630 managed IEEE 30 bus system commonly used for power system testing. The IEEE 30-bus test case represents a simple approximation of the American Electric Power system as it was in December 1961.

The attacker utilizes sensors 625 to collect power flow data over a period of time, which may include days, weeks or months, before attacking. For example, attacker 620 is attempting to compromise state estimation for the voltage phase angle on bus 25 by utilizing sensors 625 placed around or in the vicinity of bus 25. In some embodiments, the state to be estimated includes at least one of a linear state estimation and a nonlinear state estimation.

Although not shown, in some embodiments, SCADA 630 is communicatively coupled to at least one of a topology processor component, an analyzer component, a state estimator component and a bad data detector component. In some embodiments, one or more of the components are implemented in a control unit of the smart grid for IEEE 30 bus system 640. In some embodiments, the components work together for detecting the state of the grid. In some embodiments, data from SCADA 630 at a particular instant of time is used to obtain topology by the topology processor and to perform analog observations and error detection by the analyzer. In some embodiments, the analog observations include observations in power, voltage, current etc, in the SCADA data.

Attacker 620 uses a measurement matrix 622 to determine an attack vector 623, which is then injected as false measurement data 624. In some embodiments, measurement matrix 622 is constructed as a Jacobian matrix from measurement data 621, where the number of rows and columns are equal to the number of measurements and state variables, respectively. In some embodiments, attacker 620 determines attack vector 623 using arbitrary measurements.

AI/ML BFDI detection model 680 that has been trained to simulate a stealthy blind false data injection attack utilizing historical measurements and an adversarial neural network, as described herein, is able to detect false measurement data 685 and thwart the attack.

Figure 7:
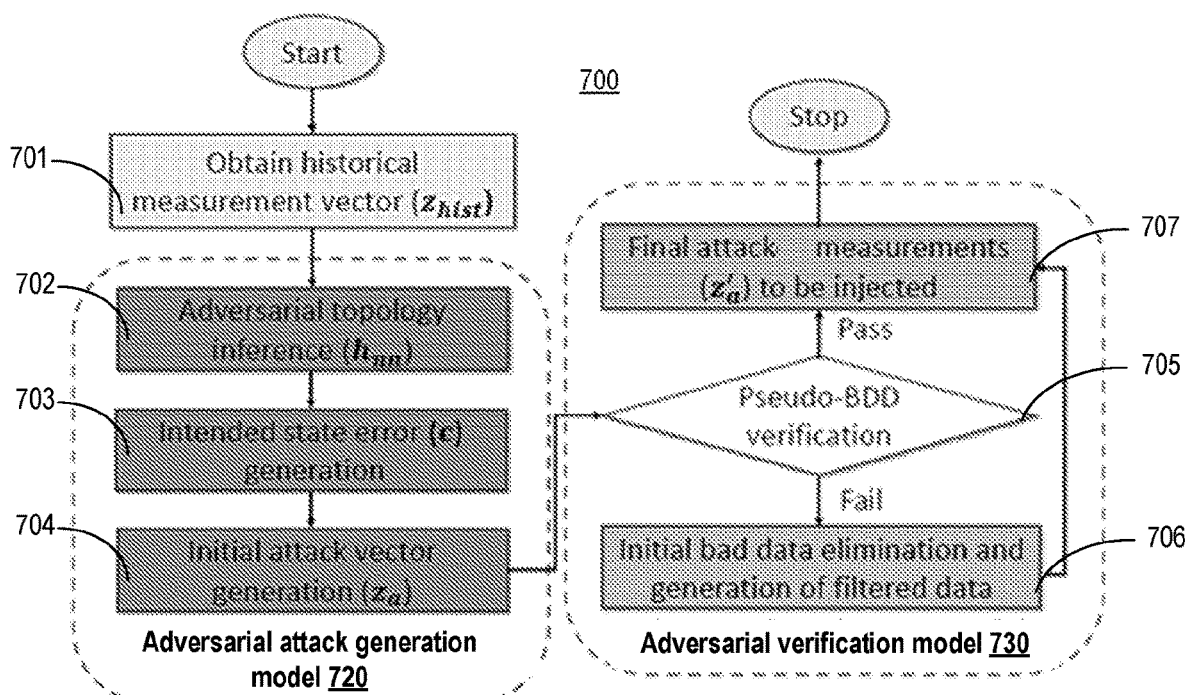
FIG. 7 is a flow chart for training an adversarial neural network to simulate a stealthy blind false data injection attack on a cyber physical system in accordance with some embodiments.

FIG. 7 is a flow chart for training an adversarial neural network to simulate a stealthy blind false data injection attack on a cyber physical system in accordance with some embodiments.

Referring to FIG. 7, in some embodiments, method 700 utilizes, generates or develops adversarial attack generation model 720 and adversarial verification model 730.

At step 701, a historical measurement vector is obtained based on collected historical measurements, e.g., voltage angle and magnitude measurements. For example, the attacker or virtual attacker may collect offline historical measurement data for weeks, or in some cases months, before the attack or simulation of an attack. In some embodiments, the attacker or virtual attacker may collect online data by deploying their own metering devices to gather sensor measurements. Method 700 proceeds to develop the adversarial attack generation model 720.

At step 702, an adversarial topology inference is generated. Using the collected historical measurements, the attacker or virtual attacker utilizes the function approximation property of an artificial neural network (ANN) to infer topology of the cyber physical system. To train the network, the attacker or virtual attacker uses a subset of the historical measurements, which may include, for example, the voltage angle and magnitude measurements. The outputs include measurements with all the parameters including, for example, voltage angles, magnitudes, active and reactive power flows, and generated power. The inferred topology $h_{nn}$ is then the mapping function between the inputs and the outputs, which is the trained ANN. The inferred topology $h_{nn}$ embedded in the trained network is used to generate the attack measurement $z_a$, determine the substitute BDD threshold $\tau_p$ and apply the substitute BDD filtering.

At step 703, intended state error is generated. In some embodiments, the intended state deviation is generated using a random gaussian distribution.

At step 704, an initial attack vector is generated using the trained ANN. Input of the trained ANN is the subset of the measurements from step 702 and the state error from step 703, and the output is initial attack measurements.

At step 705, each initial attack vector is verified for bad data by pseudo-bad data detection (BDD) verification, or substitute BDD.

At step 706, initial bad data is eliminated, and the remaining filtered data suitable for use as final attack measurements. That is, the substitute BDD finds and eliminates the initial bad data in the attack measurements, which results in lower risk of detection by the true BDD.

At step 707, final attack measurements to be injected are generated. That is, final attack measurements are a subset of initial attack vectors, after having been filtered for bad data at step 706 based on pseudo-BDD verification at step 705.

In some embodiments, final attack measurements can be used to develop counter measures to protect the CPS against an attack that can be detected based on the final attack measurements. In some embodiments, a signature-based counter measure is adapted for such a defense mechanism, which operates like a fingerprint detection that can represent known threats in advance.

Figure 8:
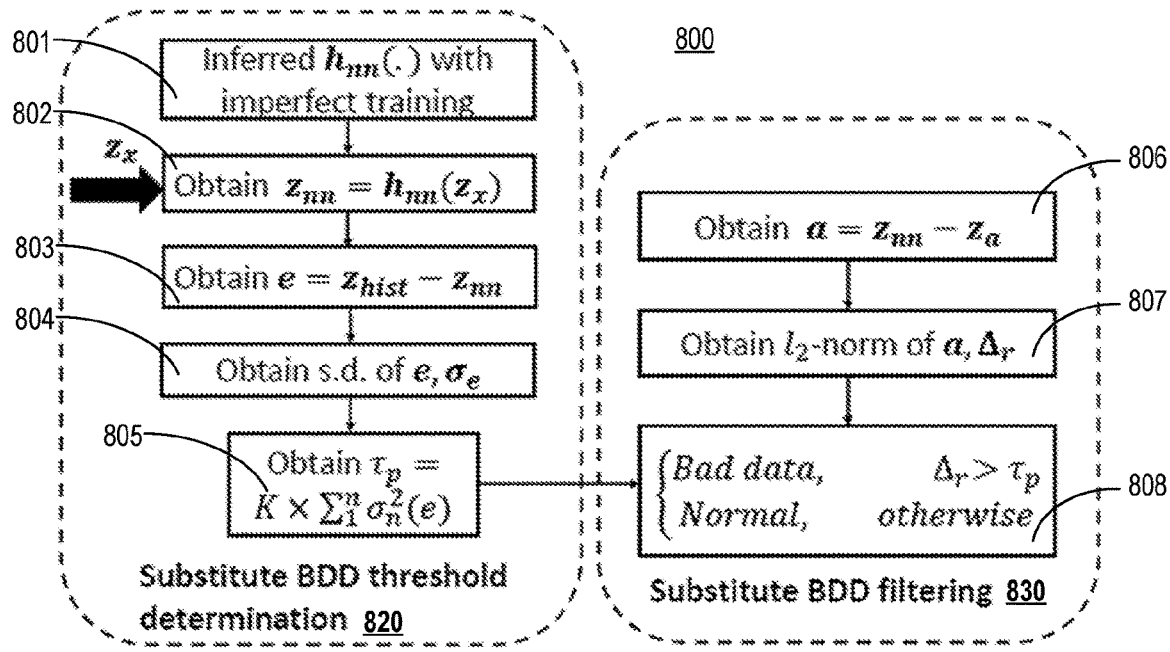
FIG. 8 is a flow chart for determining a filtering threshold for a simulated stealthy blind false data injection attack on a cyber physical system in accordance with some embodiments.

FIG. 8 is a flow chart for determining a filtering threshold for a simulated stealthy blind false data injection attack on a cyber physical system in accordance with some embodiments.

Referring to FIG. 8, in some embodiments, method 800 generates or develops the substitute BDD according to some embodiments, including substitute BDD threshold determination 820 and substitute BDD filtering 830.

At step 801, imperfectly trained ANN $h_{nn}$ produces an inferred grid topology. The grid topology is inferred based on a Blind Adversarial Artificial Neural Network and historical measurements. This estimation of the grid topology $h_{nn}(\cdot)$ is then used to generate attack vectors.

The network obtained from the trained ANN, $h(\cdot)$ will represent the mapping function between the output and the input. The inferred topology $h_{nn}$ embedded in the trained network will be used to generate the attack measurement $z_a$, determine the substitute BDD threshold $\tau_p$ and apply the substitute BDD filtering.

At step 802, a pseudo estimation of the ANN generated measurements is obtained $\hat{z}_{nn} = h_{nn}(z_x)$. That is, the imperfectly trained ANN $h_{nn}$ from step 801 is trained with the subset of the measurements vector that measures the state to be estimated $z_x$ as input, producing the pseudo estimation of the ANN generated measurements.

At step 803, the error vector $e = z - z_{nn}$ is obtained by computing the difference between historical and pseudo-estimated measurements from step 802.

At step 804, the standard deviation of the error from step 803 is obtained $$\sigma_e = \sqrt{\frac{\sum_{i=1}^{n}(e_i - \mu_e)^2}{n}},$$

based at least on the average of the error vector and the number of samples. That is, $\mu_e$ is the average of error vector e and n is the number of samples. The squared sum of $\sigma_e$ is then multiplied by a scalar K to get the final $\tau_p$ at step 805.

At step 805, the threshold $\tau_p$ is obtained $\tau_p = K \times \Sigma_{i=1}^{n} \sigma_{e_i}^2$ by computing the squared sum of the result from step 804, multiplied by a scalar K. In some embodiments, the scalar K is used to adjust the aggressiveness of the substitute BDD threshold based on attacker's knowledge of the true BDD from open source or domain expertise. A smaller threshold $\tau_p$ results in more filtered and stealthy entries in the general attack vector before it is injected. A large threshold $\tau_p$ will take a more aggressive approach and inject more errors with a higher chance of detection by the true BDD.

At step 806, the difference between the pseudo estimation of the ANN generated measurements from step 802 and the initial attack measurement vector is calculated.

At step 807, the l2-norm of the difference in step 807 is obtained. The initial residual is normalized to obtain the normalized residual vector.

In some embodiments, the $\ell_2$-norm calculates the distance of the vector coordinate from the origin of the vector space. As such, it is also known as the Euclidean norm as it is calculated as the Euclidean distance from the origin. The result is a positive distance value. If x is a vector, $$\begin{bmatrix} x_1 \\ x_2 \\ \ldots \\ x_n \end{bmatrix}$$

then the $\ell_2$-norm of x is calculated as $$|x|_2 = \sqrt{\sum_{k=1}^{n} |x_k|^2}.$$

In state estimation, $\ell_2$-norm quantifies the difference between the observed and estimated measurements to detect bad data. In some embodiments, the $\ell_2$-norm quantification method is applied to the initial attack vector to filter out the bad data and obtain the final attack vector.

The residual vector is the difference between the attack measurements and historical (non-attack) measurements. The $\ell_2$-norm of this residual vector is used to compare against the substitute-BDD threshold.

At step 808, the threshold is applied to filter out the bad data. Each element is compared with the threshold so that if the residual vector is higher than the threshold, the bad data may be flagged at the corresponding attack measurement, and the entry is removed from the initial attack vector.

In some embodiments, in the true BDD, the residuals may be normalized using the topology matrix H. Without access to the topology, the min-max normalization method may be used before the residual is compared to the substitute BDD threshold.

Figure 9:
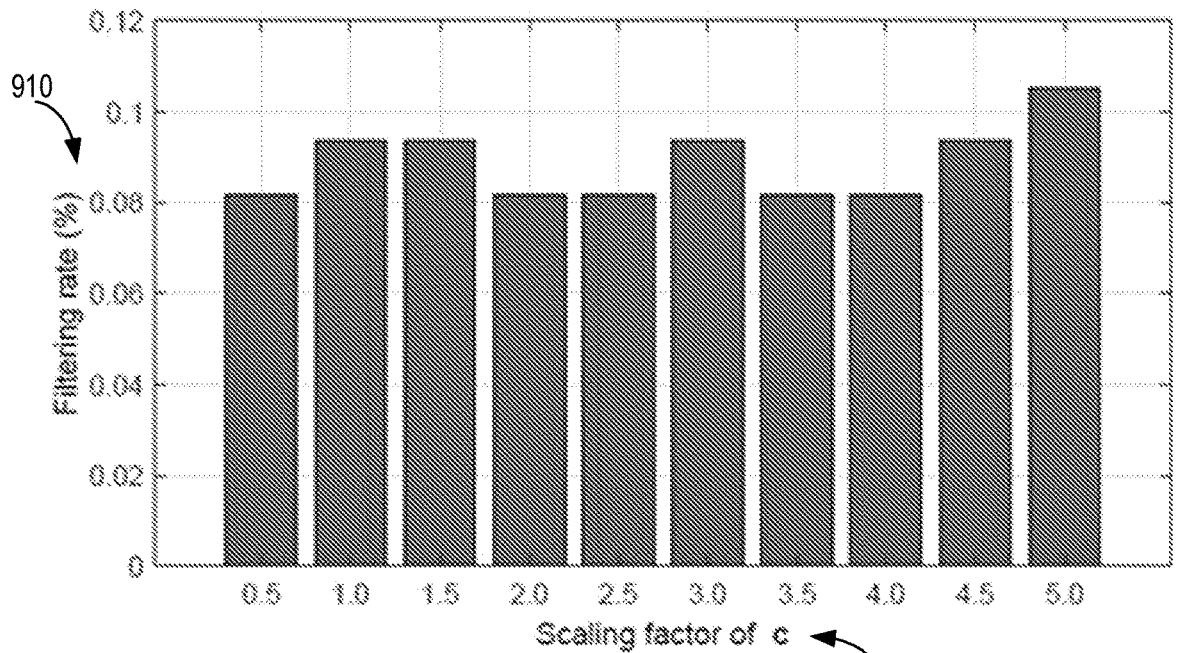
FIG. 9 is a chart illustrating different scaling factors for filtering in accordance with some embodiments.

FIG. 9 is a chart illustrating different scaling factors for filtering the substitute BDD in accordance with some embodiments.

In chart 900, attack performance under the substitute BDD is evaluated when setting the substitute BDD threshold $\tau_p$ to 1.15. A scaling factor a is applied to c 920. The scaling factor a is set between 0.5 and 5.0.

For this performance evaluation, 30 independent experiments under each a were conducted. The chart shows filtering rate 910 which is the average percentage of pseudo bad data filtered by the substitute BDD among the 284 measurements in the 30 experiments. The filtering rate 910 is below 1.1% for all scaling factors 920. Thus, the false attack data created by the ANN-based adversarial topology inference and attack generator has been determined, by the substitute BDD, as having a low chance of being detected after injection. The filtering rate 910 also increases slightly when the attacker increases the magnitude of the injection with larger scaling factor 920. Therefore, the substitute BDD is effective in filtering high-risk attack vectors.

Figure 10:
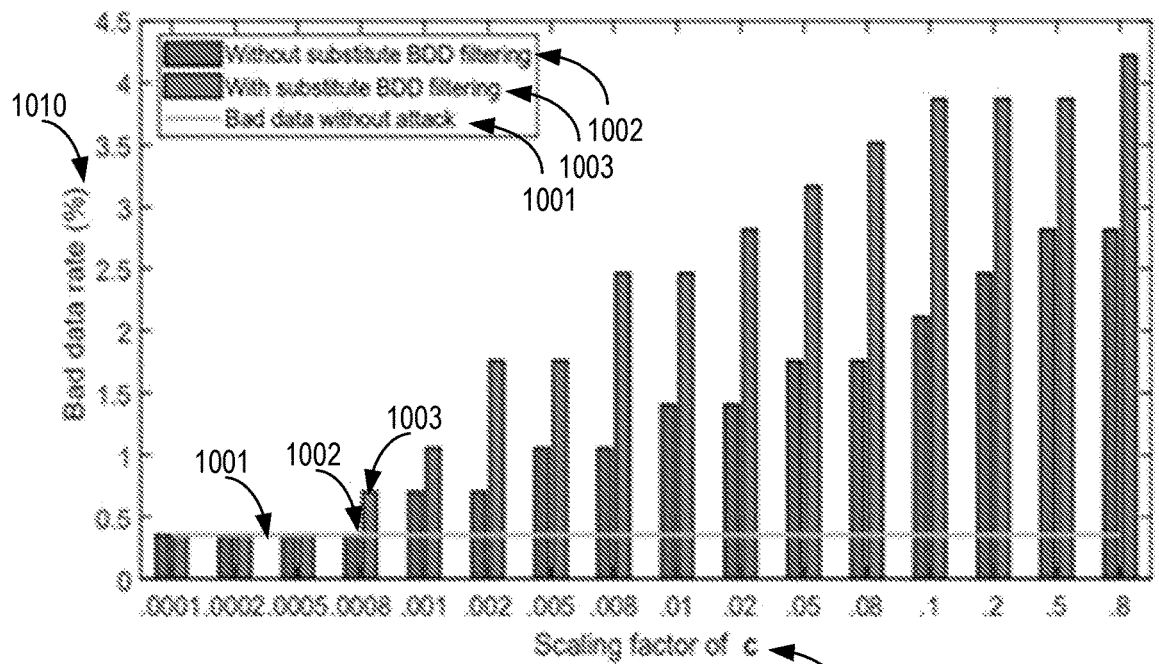
FIG. 10 is a chart illustrating a bad data rate by the true Bad Data Detection (BDD) with and without filtering by the substitute BDD in accordance with some embodiments.

FIG. 10 is a chart illustrating a bad data rate by the true BDD with and without filtering by the substitute BDD in accordance with some embodiments.

In chart 1000, attack performance under the true BDD is evaluated, by comparing the bad data reported by the true BDD with substitute BDD filtering 1003 and without the substitute BDD filtering 1002. The substitute BDD threshold $\tau_p$ is set to 1.15. A scaling factor a is applied to c 1020. The scaling factor a is set between 0.0001 and 0.8.

The effectiveness of the BDD is evaluated by comparing the bad data reported by the true BDD with 1003 and without the substitute filtering 1002. The results under different scaling factors 1020 show the bad data rate 1010 which refers to the percentage of measurements flagged as bad data among the 284 measurements at any given moment. For lower scaling factors between 0.0001 and 0.0005, the detection performance of the true BDD remains the same before and after removal of the initial bad data 1001. As a increases, the substitute BDD starts to filter data that could be risky to the attacker, which effectively lowers detection of the greater attack vectors under the true BDD. The difference widens when a increaser further. Therefore, utilizing the substitute BDD is relatively more effective when an attacker ramps up the strength of the attack.

The reduced effectiveness of the substitute BDD at lower a is explained by how $\tau_p$ is determined. The training error threshold, set to terminate the ANN training, was not set as close to zero as a typically trained ANN. This indicates that the training of the ANN was not optimal, and this is intentional. Setting $\tau_p$ to zero will invalidate the filtering by the substitute BDD as any generated false data will be filtered under these zero tolerances, leading to an overly conservative model that will not inject any false data to avoid detection at all costs. Therefore, the substitute BDD under a slightly increased $\tau_p$ will not activate filtering for smaller a.

Figure 11:
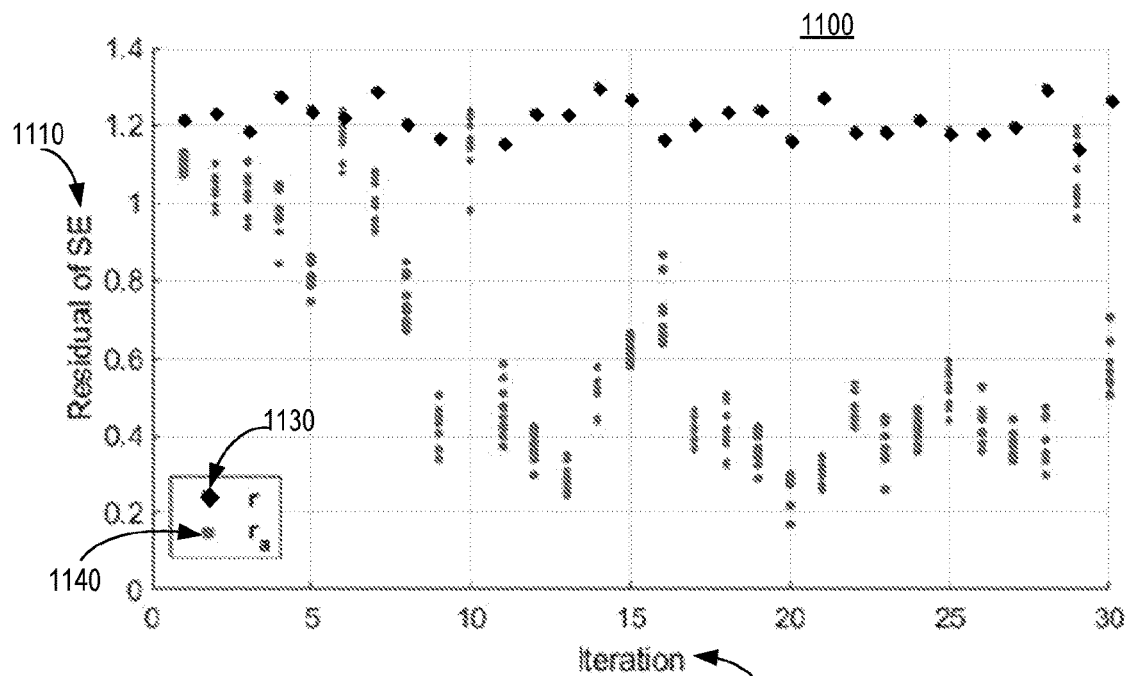
FIG. 11 is a chart comparing residuals before and after the simulated attack in accordance with some embodiments.

FIG. 11 is a chart comparing residuals before and after the simulated attack in accordance with some embodiments. In chart 1100, residuals before and after the simulated attack are compared to inspect the potential change of data quality in a stealth BFDI attack that successfully bypasses the true BDD. The residual r 1130 before a stealth attack and the residual $r_a$ 1140 after a stealth attack is plotted per iteration 1120 and residual of SE 1110. The attacks successfully bypass the true BDD, in most of the cases with $r_a < r$. The results show that the substitute BDD lowers the level of noise and thus the chance of a lucky hit by the true BDD. The attack vector is more reliable than the original, and the attack vector is harder to detect when mixed in with the likely natural bad data in the system.

Figure 12:
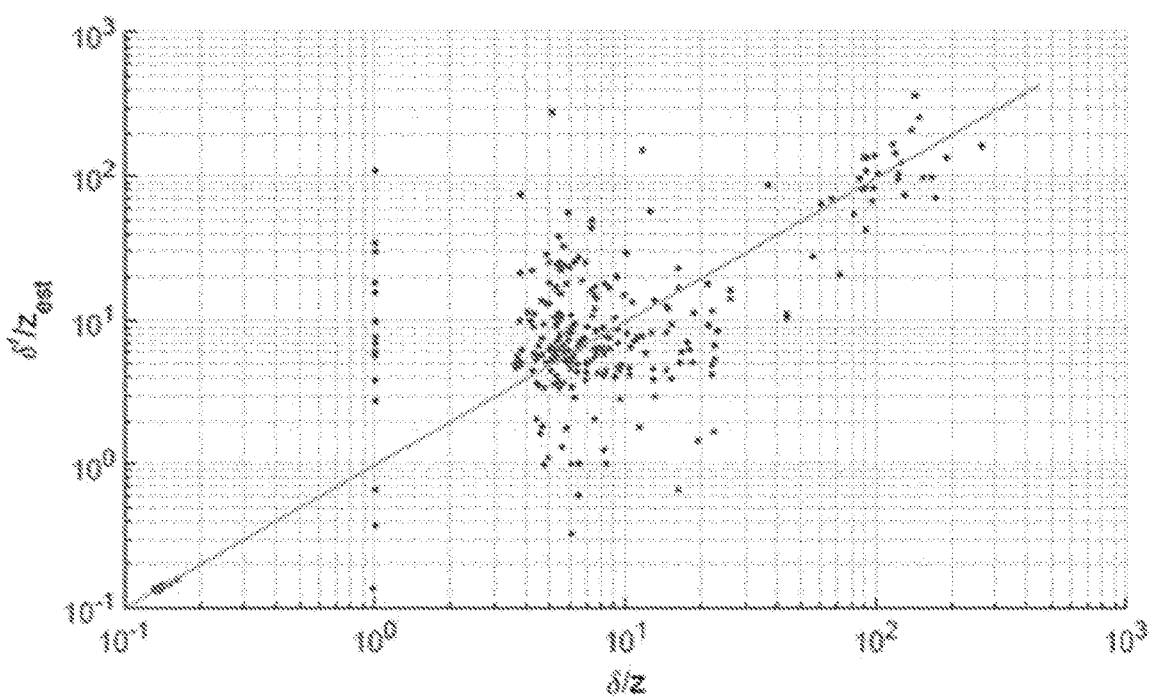
FIG. 12 is a chart for deviation of estimated and attack measurements in accordance with some embodiments.

FIG. 12 is a chart for deviation of estimated and attack measurements in accordance with some embodiments. In chart 1200, deviation of estimated and attack measurements with respect to the original are plotted. The magnitude of deviation inflicted by the stealth BFDI is evaluated since the attack measurements in the FDI schemes are subject to the data processing by state estimation of the smart grid. The impact will be analyzed by comparing the differences between the state estimation inputs (attack measurements) and the state estimation outputs (estimated measurements) in the stealth BFDI.

Based on 30 experiments conducted, the results in FIG. 12 show, in log scale, the average deviation of $\hat{z}_a$ and $z_a$ with respect to the original pre-attack measurement under a different scaling factor. While the deviations are distributed on both sides of the diagonal, many estimates are above the diagonal. This distribution suggests that the injected deviation is magnified after state estimation.

Figure 13:
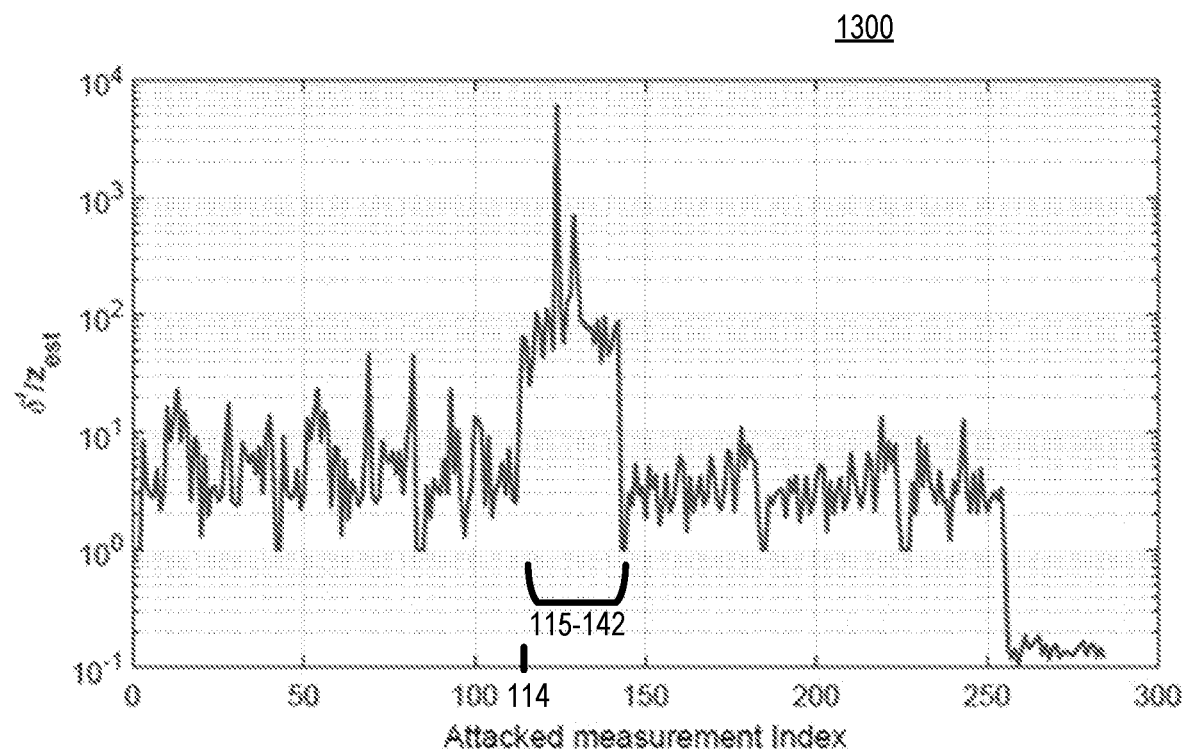
FIG. 13 is a chart for deviation of estimates after injection on measurement in accordance with some embodiments.

FIG. 13 is a chart for deviation of estimates after injection on measurement in accordance with some embodiments. In chart 1300, deviation of estimates after injection on measurement is plotted. Injection of a single false data point is into the measurement is evaluated for impact. In this example, a deviation of −0.061 was injected into measurements 114 (voltage angle of bus 2) before the state estimation. The consequent deviations in $\hat{z}_a$ are shown in FIG. 13. Significant spikes in measurements 115-142 in $\hat{z}_a$ are observed, which are the voltage angles of all remaining buses. By injecting error into only one meter, the false data injection can inflict significant deviation across the entire 30-bus system. The deviations are 10 to 1000 times greater than the ground truth. These results confirm the substantial impact of the false data injection with a low chance of being detected.

Figure 14:
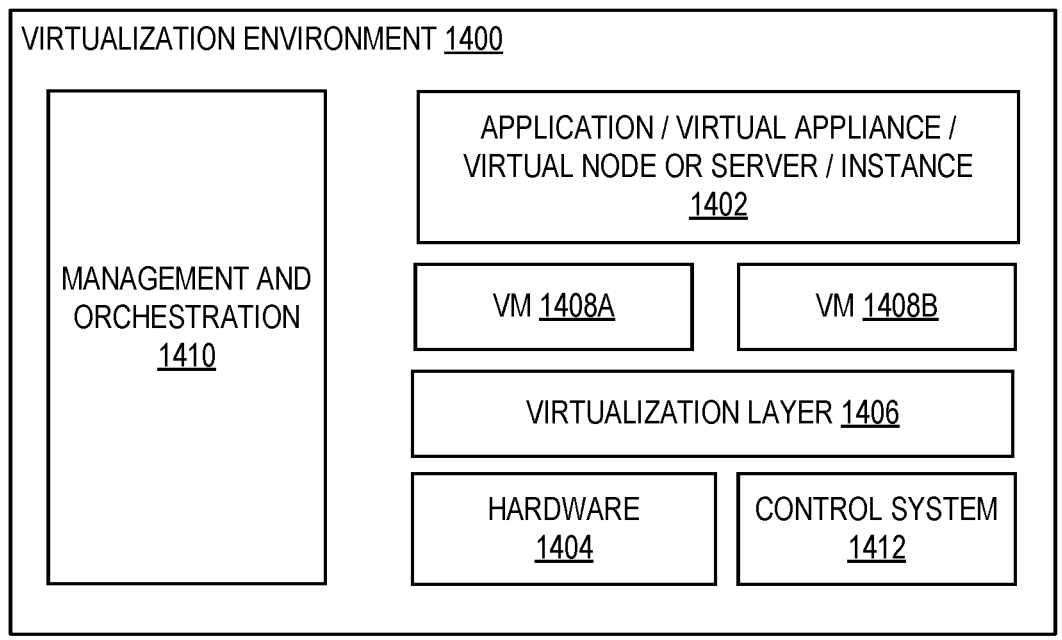
FIG. 14 is a block diagram illustrating a virtualization environment in accordance with some embodiments.

FIG. 14 is a block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components.

Some or all the functions described herein, including, for example, task offloading, and scheduling related to training an adversarial neural network to simulate a stealthy blind false data injection attack on a cyber physical system, may be implemented as virtual components executed by one or more virtual machines (VMs), resulting in a decrease of time delay and energy consumption, and an increase of task accuracy. The one or more VMs may be implemented in one or more virtual environments 1400 hosted by one or more of hardware nodes, such as a hardware computing device that operates as a network node, user equipment (UE), core network node, host, web server, application server, virtual server or the like.

Further, in embodiments in which the virtual node does not require radio connectivity (e.g., a core network node or host), then the node may be entirely virtualized. In some embodiments, training AI/ML false data injection models may be implemented as virtual components executed by one or more virtual machines (VMs) implemented in one or more virtual environments 1400 hosted by one or more of hardware nodes.

In some embodiments, at least one of historical data collector, topology inference model, adversarial attack generation model, adversarial verification model, and counter measure generator may be implemented as virtual components executed by one or more virtual machines (VMs) implemented in one or more virtual environments 1400 hosted by one or more of hardware nodes.

Applications 1402 (which may alternatively be called software instances, virtual appliances, network functions, virtual nodes, virtual network functions, etc.) are run in the virtualization environment 1400 to implement some of the features, functions, and/or benefits of some of the embodiments disclosed herein, including, for example, systems and methods for training an adversarial neural network to simulate a stealthy blind false data injection attack on a cyber physical system.

Hardware 1404 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1406 (also referred to as hypervisors or virtual machine monitors (VMMs)), provide VMs 1408a and 1408b (one or more of which may be generally referred to as VMs 1408), and/or perform any of the functions, features and/or benefits described in relation with some embodiments described herein, including, for example, systems and methods for training an adversarial neural network to simulate a stealthy blind false data injection attack on a cyber physical system. The virtualization layer 1406 may present a virtual operating platform that appears like networking hardware to the VMs 1408.

The VMs 1408 comprise virtual processing, virtual memory, virtual networking or interface and virtual storage, and may be run by a corresponding virtualization layer 1406. Different embodiments of the instance of a virtual appliance 1402 may be implemented on one or more of VMs 1408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1408 may be a software implementation of a physical machine that runs programs as if they were executing on a physical, non-virtualized machine. Each of the VMs 1408, and that part of hardware 1404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1408 on top of the hardware 1404 and corresponds to the application 1402.

Hardware 1404 may be implemented in a standalone network node with generic or specific components. Hardware 1404 may implement some functions via virtualization. Alternatively, hardware 1404 may be part of a larger cluster of hardware (e.g., such as in a data center or customer premises equipment (CPE)) where many hardware nodes work together and are managed via management and orchestration 1410, which, among others, oversees lifecycle management of applications 1402. In some embodiments, hardware 1404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1412 which may alternatively be used for communication between hardware nodes and radio units.

In some embodiments, in AC state estimation, power flow measurements z are a function of the states x, given by the following equation:

$$z = h(x) \tag{1}$$

where z is the m-by-1 measurement vector collected at a given moment and x is the n-by-1 state vector to be estimated from z. The non-linear mapping h(•) function between z and x can be solved by an iterative process. In some embodiments, the iterative process includes at least one of an Honest Gauss-Newton Method, a Dishonest Gauss-Newton Method and a Fast Decoupled State Estimator. In some embodiments, because AC state estimation is computationally expensive and sometimes infeasible, DC state estimation may be used.

Bad data detection is widely used to detect and eliminate bad data using state estimation through residual-based hypothesis tests. In some embodiments, the residual-based hypothesis test is built on the random distribution of the residual measurement r, given by the following equation:

$$r = z - h(\hat{x}) \tag{2}$$

The 12-norm of r is used in a khi-2 test against a null hypothesis. If the statistics of the residual are above a certain threshold, it indicates the presence of bad data. A khi-2 test is a statistical test used to compare observed results with expected results. For example, let $r=z-h(\hat{x})$ be the measurement residual, the normalized $\ell_2$-norm of r is $L(r)=r^T R^{-1} r$. $L(r)$ follows the $\chi_{M-N}^2$ distribution with at most M−N degree of freedom. Therefore, the $\chi^2$-test is used to determine a threshold τ with a given confidence p.

The null hypothesis is a characteristic arithmetic theory suggesting that no statistical relationship and significance exists in a set of given, single, observed variables between two sets of observed data and measured phenomena. The hypotheses play an important role in testing the significance of differences in experiments and between observations. H0 symbolizes the null hypothesis of no difference. It presumes to be true until evidence indicates otherwise.

For example, the null hypothesis $H_0$ of the residual-based bad data test is denoted by $H_0: r^T R^{-1} r \leq \tau$. If $H_0$ is accepted, then no bad data exists in the state estimation solutions with a confidence of p. If $H_0$ is rejected, then bad data exists, and they are subsequently eliminated by the largest normalized residual (LNR) test.

If the complete topology of the AC state estimation (SE) is known, the attacker can generate an attack vector such that the residual in Equation 2, before and after the attack, remains the same, where $r_a = r$.

In some embodiments, the AC FDI scheme is given by the following equation:

$$a = h(\hat{x}_a) - h(\hat{x}) \tag{3}$$

The AC FDI scheme as shown in Equation 3 requires full knowledge about the mapping between the states and the measurements. If the nonlinear model h(•) is perfectly known, then the attack is stealthy.

In some embodiments, the attacker does not have any information about the topology but only the measurements. A blind false data injection can compensate for the absence of knowledge of the grid topology by inferring an alternative topology to generate a stealthy attack vector.

In some embodiments, attack measurements from inferred alternative topology can be formulated by given by the following equation:

$$z' = z + a' = z + h'c \tag{4}$$

The prime (') indicates the alternative. In some embodiments, the intended state deviation is generated by using a Gaussian distribution and a scaling factor a to vary the dynamic range of the vectors.

In some embodiments, the adversarial neural network is utilized as the topological inference technique for its ability to act as function approximation. The measurements and the states are non-linearly dependent. In some embodiments, the attacker may eavesdrop some measurements. An adversarial artificial neural network is highly suitable to infer this complex mapping function h(•) by finding the appropriate weights and bias from the measurements.

The artificial neural network is trained with measurements, whereby all the parameters are used as output and a subset of measurement parameters are used as inputs. In some embodiments, the output measurements (z) include voltage angle and magnitudes, active and reactive power flows, and generated power. In some embodiments, the input measurement ($z_x$) includes voltage angles and magnitudes.

In some embodiments, the attacker may train the artificial neural network with the information on measurements, given by the following equation:

$$z = \phi\left(\sum_{j=1}^{n} w_j z_{xj} + b\right) \quad (5)$$

where z is the m-by-1 output, $z_{x1}, z_{x2}, \ldots, z_{xn}$ are the inputs, $w_1, w_2, \ldots, w_n$ are the synaptic weights, b is the bias, and $\phi$ is the activation function. In some embodiments, the network obtained from the trained artificial neural network, h(•) may represent the mapping function between the output and the input. In some embodiments, the inferred topology $h_{nn}$ embedded in the trained network may be used to generate the attack measurement $z_a$, determine the substitute BDD threshold $\tau_p$ and apply the substitute BDD filtering.

In some embodiments, the goal of the training is to minimize the error between the predicted and observed output, where the error is zero or near zero. In some embodiments, the attacker is assumed to have no knowledge of the BDD model. In some embodiments, the l2-norm may be used based on a substitute model and the terminal training error may be increased for initial filtering of the generated attack measurement.

In some embodiments, the topology inference may be bounded by a target training error threshold. If the terminal training error is large, an inaccurate topology may be produced which will generate detectable attack measurements. In some embodiments, the training goal is set to near-zero, and the artificial neural network trains accurately.

In some embodiments, the error between the observed and estimated measurement by the trained network becomes negligible and may not be fit to determine the threshold $\tau_p$. Therefore, selecting the appropriate threshold $\tau_p$ depends on selecting a proper minimum training error for the artificial neural network. In some embodiments, the threshold may be set to one-fifth of a threshold found in literature, to make it less aggressive. The ANN may then be run with varying non-zero training errors at least one time or more, until an approximate threshold is obtained. For example, the ANN training may start with training error at 0.0001 and keep increasing the training error until the desired substitute-BDD threshold is reached, for example with training error at 0.0008.

In some embodiments, the attack measurements are generated based on the trained artificial neural network and the historical measurements. In some embodiments, the subset of the measurement vector that measures the state to be estimated is selected, meaning $v_a$ and $v_m$ and denoted by $z_x$. The subsets are injected with the intended state deviation c to obtain: $z'_x = z_x + c$. In some embodiments, the output produced by the trained artificial neural network includes the initial attack measurements denoted by $z_a$ and may be filtered by the substitute BDD.

In some embodiments, the initial attack measurements are given by the following equation:

$$z_a = h_{nn}(z'_x) \quad (6)$$

where in equation 6, $h_{nn}$ is the trained artificial neural network.

In some embodiments, a stealthier attack model can be achieved by filtering the initial attack measurement by the attacker. In some embodiments, this post process may find and filter the bad data so that the risk of detection by the true BDD is low, ensuring attack success from the attacker's perspective. The l2-norm based substitute BDD model may verify the attack measurement before injection. The process for determining the substitute BDD threshold according to some embodiments is shown in FIG. 8.

In some embodiments, to perform the post-process filtering, the first step consists in determining the pseudo-BDD threshold $\tau_p$. First, the error threshold is set to zero to determine the training process to a value higher than zero. The training is performed using different error thresholds. In some embodiments, the optimal training error threshold from this range may allow inferring of the topology accurately with an acceptable substitute BDD threshold. To determine threshold $\tau_p$, a pseudo estimation of the artificial neural network generated measurements $\hat{z}_{nn}$ is first obtained using the trained artificial neural network with the measurements $z_x$ as input.

In some embodiments, a pseudo estimation of the artificial neural network generated measurements $\hat{z}_{nn}$ are given by the following equation:

$$\hat{z}_{nn} = h_{nn}(z_x) \quad (7)$$

The error vector between historical and pseudo-estimated measurements is obtained as: $e = z - z_{nn}$. In some embodiments, the standard deviation of the error is given by the following equation:

$$\sigma_e = \sqrt{\frac{\sum_{i=1}^{n}(e_i - \mu_e)^2}{n}} \quad (8)$$

where $\mu_e$ is the average of error vector e and n is the number of samples. The squared sum of $\sigma_e$ is then multiplied by a scalar K to get the final $\tau_p$.

In some embodiments, the threshold $\tau_p$ is given by the following equation:

$$\tau_p = K \times \sum_{i=1}^{n} \sigma_{e_i}^2 \quad (9)$$

The scalar K is set to adjust the aggressiveness of the substitute BDD threshold based on attacker's knowledge of the true BDD from open source or domain expertise. A smaller $\tau_p$ will lean toward stealthiness and filter more entries in the general attack vector before it is injected. A large $\tau_p$ will take a more aggressive stance to inject more errors with a higher chance of detection by the true BDD. The factor K is set to allow more strict filtering.

The initial residual is then normalized using min-max normalization and tested against $\tau_p$.

In some embodiments, initially the $l_2$-norm between the artificial neural network-estimated measurements $\hat{z}_{nn}$ and the initial attack measurement $z_a$ is given by the following equation:

$$r' = \hat{z}_{nn} - z_a \quad (10)$$

In some embodiments, the initial residual is then normalized using min-max normalization and tested against $\tau_p$, as given by the following equation:

$$e'_i = \frac{e_i - e_{min}}{e_{max} - e_{min}} \quad (11)$$

where i=1,2, . . . , m is the index of the measurements.

Then, the normalized residual vector $\Delta$ is obtained. In some embodiments, the normalized residual vector $\Delta$ is given by the following equation:

$$\Delta_i = r'^2_i / e'_i \quad (12)$$

With $\Delta$, we compare each element with $\tau_p$ so that if $\Delta_i > \tau_p$, a bad data point may be flagged by the true BDD at the corresponding attack measurement $z_{a_i}$. In some embodiments, this entry is removed from $z_a$ before injection to lower the change of detection. Finally, the attacker obtains attack measurements $z'_a$ that have a much lower possibility of detection than $z_a$.

The AI/ML false data injection detection model is evaluated to understand the real-world risk of impacting state estimation. The effectiveness of the attack is evaluated, considering the presence of missing or unspecified bad data.

Generally, detection probability may be used as an evaluation metric, which refers to the detection rate when false data is injected, like a true positive analysis. In some embodiments, AI/ML false data injection detection model is tuned based on indices or the residual s of the measurement before and after the attack. For example, indices or residuals may reveal information about the effectiveness and stealthiness of the false attack data.

In some embodiments, the presence of bad data before the attack is due to sensor faults, communication delays or other natural reasons in the cyber physical system. In some embodiments, the incumbent true BDD may detect and eliminate such data if the data fails to pass the statistics test for bad data. Injection of false data can either introduce no additional bad data (most stealthy option), eliminate the pre-existing bad data (less stealthy option), or create new bad data (detected, least stealthy). Thus, the stealthiness of a false data injection under the true BDD refers to the fact that no changes have been made to the results of the true BDD after the attack. Any addition or removal of detectable bad data will be considered as detected in this case.

In some embodiments, alternative criteria may be adopted to evaluate a false data injection to ensure that only data other than bad data will be detected after the attack. Such criteria allow the removal of natural or benign bad data in the measurement. In some embodiments, false data is accidentally injected into existing bad data. For example, an attacker manipulating the voltage that is already corrupted by a faulty sensor results in a lucky hit by the BDD despite a carefully crafted model.

In some embodiments, the quality of the attack measurement may be analyzed. In some embodiments, detected and eliminated bad data represents abnormal noise that is statistically significant, which lowers the quality of the measurements. In some embodiments, the low quality of the data may be determined by the residual between observed and estimated measurements. A smaller margin between normal and bad data after the attack can also raise the chance of detection against the attackers due to inherent randomness in the measurements. Unusually and abruptly changed residual may be evaluated even if the data is not triggering a bad data alarm.

In some embodiments, operators make crucial decisions based on estimated states. Thus, attack evaluation should focus on the impact of the attack on estimated states and measurements. From the attacker's perspective, a relatively sparse attack vector which can cause a large deviation in the estimated measurements is desirable. In some embodiments, the errors directly injected into the attack measurements as input to the state estimation are evaluated as well as the impact of the attack by investigating the estimated measurements as the state estimation outputs after the attack.

Systems and methods for training an adversarial neural network to simulate a stealthy blind false data injection attack on a cyber physical system may be evaluated with an IEEE 30-bus test system from MATPOWER toolbox and the neural network toolbox in MATLAB®. A total of 2000 samples may be collected over a week, to train the adversarial artificial neural network. The load variation in the test system may be simulated using the real-world load profile of independent system operators (ISO) New England during April of 2020. Optimal power flow was solved with the given load profile to obtain the measurements as input of state estimation and the false data injection.

The artificial neural network may be designed with four layers and the Tan-Sigmoid activation function may be used in the topology inference module. The artificial neural network may be trained by the gradient descent with adaptive momentum. Each hidden layer may have 210 hidden neurons. The threshold $\tau_p$ may be determined to be around 1.15. 2000 samples may be used to obtain the standard deviation. To evaluate the attack strength, a scaling factor a may be applied to c. The scaling factor a may be set between 0.5 and 5.0 when validating the substitute BDD and between 0.0001 and 0.8, when evaluating the attack performance under the true BDD.

The AI/ML false data injection detection model may be built on the nonlinear AC SE model due to potential discrepancy between AC-based and DC-based topology that can affect attack stealthiness. The discrepancy between the topology matrix in DC-SE and their corresponding values in AC-SE is compared in Table 1.

TABLE 1

| Discrepancy Statistics (%) | | Top-4 Discrepancies (%) |
| --- | --- | --- |
| Average | 27.55 | 324.98 |
| Median | 18.37 | 248.35 |
| 75th Percentile | 27.44 | 241.66 |
| 25th Percentile | 6.25 | 233.33 |

Table 1 above shows the most notable discrepancies between the DC-SE-based topology and the AC-SE-based topology for the IEEE 30-bus system. The average deviation of the entries in DC topology is 27.55%. Table 1 also shows discrepancy statistics, such as average, median, 75th percentile and 25th percentile of deviation percentages. These statistics indicate that there is a substantial difference between AC and DC topology matrices. For the attack vector a, given an all-one state error c, the discrepancies above will result in an average of 643.73% difference between the AC-based and DC-based attack vectors. These results indicate that if a false data injection attack is launched using DC-SE on AC-SE, there is a good chance the residuals will cause detection of the attack.

To evaluate the effectiveness of the substitute BDD in filtering high-risk attack vectors, 30 independent experiments under each a may be conducted. The percentage of pseudo bad data filtered by the substitute BDD among the 284 measurements may be obtained. FIG. 9 shows the average percentage of data filtered before injection among the 30 experiments. The filtering rate is below 1.1% for all scaling factors a which indicates that most false data created by the artificial neural network-based adversarial topology inference and attack generation have been considered by the substitute BDD, with a low chance of being detected after injection. Further, the filtering rate increase correlates to attack magnitude increase of injection with a large scaling factor a.

Reported bad data is compared with and without injection for each scaling factor a to verify the effectiveness of the stealthiness of the filtered attack vector under the true BDD. Among 2000 attack measurements, 92.14% of the time the bad data before and after injection was reported on exactly the same meters. This suggest that a perfectly stealthy attack vector may be injected without introducing any additional bad data. For 25.6% of the time, bad data was reported on different meters after injection, suggesting a failed attack.

Among these second cases, 91% have the same number of bad data reported before and after injection with exactly one bad data point difference only by location. Despite such a difference, this imperfect false data may likely be removed directly without raising any suspicion in the control room due to a low number of bad data points. Only in 9% of the second cases (2.3% overall) the attack may be detected because of additional bad data reported by the true BDD. The overall results show that the AI/ML false data injection detection model effectively inferred the topology from the historic measurements utilizing the artificial neural network.

Based on the stealthiness that may be observed above, the effectiveness of the BDD may be evaluated by comparing the bad data reported by the true BDD with and without the substitute. The results under different scaling factors in FIG. 10 show the bad data rate, which refers to the percentage of measurements flagged as bad data among the 284 measurements at any given moment. For a lower scaling factor between 0.0001 and 0.0005, detection performance of the true BDD remains the same before and after the removal of the initial bad data. As a increases, the substitute DBB starts to filter data that could be risky to the attacker, which effectively lowers the detection of the greater attack vectors under the true BDD. The difference widens when a further increases, showing that the substitute BDD is more effective when the attacker ramps up the attack strength.

The reduced effectiveness of the substitute BDD at lower a may be explained by how $\tau_p$ is determined. The training error threshold sets to terminate the artificial neural network training, was not set as close to zero as a regular trained artificial neural network. This typically may indicate that the training of the artificial neural network was not optimal. However, in this case, the threshold was deliberately not set very near or at zero. Setting $\tau_p$ to zero will invalidate the filtering by the substitute BDD as any generated false data will be filtered under these zero tolerances, leading to an overly conservative model that will not inject any false data to avoid detection at all costs. Therefore, the substitute BDD under a slightly increased $\tau_p$ will not activate filtering for smaller a.

The potential change of data quality in a stealth false data injection that successfully bypasses the true BDD is inspected. Results are depicted in FIG. 11 where the residual (r) before and after ($r_a$) a stealth attack are illustrated. These attacks successfully bypass the true BDD, in most of the cases with $r_a<r$. The results show that the AI/ML false data injection detection model may lower the level of noise and thus the chance of a lucky hit by the true BDD (which may be good at detecting noise). The attack vector may be more reliable than the original and harder to detect when mixed with the likely natural bad data in the system.

The magnitude of deviation inflicted by the stealth false data injection is evaluated since the attack measurements in the false data injection schemes may still be subject to data processing by state estimation of the cyber physical system. The impact may be analyzed by comparing the differences between the state estimation inputs (e.g., attack measurements) and the state estimation outputs (e.g., estimated measurements) in a stealthy false data injection.

From 30 experiments conducted, the results in FIG. 12 show in log scale the average deviation of $\hat{z}_a$ and $z_a$ with respect to the original pre-attack measurement under different scaling factors. While the deviations are distributed on both sides of the diagonal, many estimates are above the diagonal. This suggests that the injected deviation is magnified after estimation.

Next, specific cases where only a single false data point is injected into the measurement may be evaluated. A deviation of −0.061 may be injected into measurements 114 (e.g., voltage angle of bus 2) before state estimation. The consequent deviations in $\hat{z}_a$ are shown in FIG. 13. Significant spikes are observed in Measurements 115-142 in $\hat{z}_a$, which are voltage angles of all remaining buses. Therefore, injecting error into only one meter, inflicts significant deviation across the entire 30-bus system under the AI/ML false data injection detection model according to some embodiments. The deviations may be 10 to 1000 times greater than the ground truth. These results confirm the substantial impact of the AI/ML false data injection detection model with a low chance of being detected.

The artificial neural network has a plurality of layers, and a plurality of parameters. The artificial neural network is a highly flexible architecture with key hyperparameters that may be tuned for better performance. These hyperparameters of interest include the training sample size, the number of layers and the activation functions.

Generally, more samples offer lower detection rates. As an example, 100 samples result in a medium detection rate of 4%, whereas more than 1000 samples bring it down to 0.5%. Further increase of the sample size does not lower the detection rate in the given artificial neural network architecture. In some embodiments, a total of 1000 samples may be an optimal subset to train the adversarial Artificial Neural network.

The number of layers has direct impact on the complexity of the artificial neural network and its ability to infer the topology for a given system. Layer numbers ranging from 4 to 10 were tested with the number of hidden neurons set to 230. The results of 30experiments for each scaling factor indicate that a detection rate with 4 layers shows small interquartile ranges compared to that of 6 and higher. Thus, in some embodiments, a 4-layer architecture may be used for a lower medium, smaller whisker, and low training complexity.

Four activation functions were tested, and the tan-sigmoid activation function achieves a low detection rate with the generated attack vectors. The detection rate range was significantly lower than the log-sigmoid, the Linear and rectified linear activation (ReLU) activation functions. Thus, in some embodiments, the tan-sigmoid activation function may be used in the adversarial artificial neural network.

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the discussion herein, numerous references are made regarding clouds, servers, services, devices, platforms, frameworks, cyber physical systems, or other systems formed from computing devices. It should be appreciated that the use of such terms is deemed to represent at least one or more computing devices having at least one processor (e.g., application-specific integrated circuit (ASIC), field-programmable gate array (FPGA), digital signal processor (DSP), x86, reduced instruction set computer architecture (ARM), ColdFire, graphics processing unit (GPU), multi-core processors, etc.) configured to execute software instructions stored on a computer readable tangible, non-transitory medium (e.g., hard drive, solid state drive, random-access memory (RAM), flash, read only memory (ROM), etc.), among other components. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on Hypertext Transfer Protocol (HTTP), secure Hypertext Transfer Protocol (HTTPS), Advanced Encryption Standard (AES), public-private key exchanges, web service Application programming interfaces (APIs), known financial transaction protocols, or other electronic information exchanging methods. Data exchanges can be conducted over a packet-switched network, a circuit-switched network, the Internet, Local area network (LAN), wide area network (WAN), virtual private network (VPN), or other type of network.

A system, server, device, model, or other computing element according to some embodiments, being configured to perform or execute functions on data in a memory, where the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computing device should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, field programmable gate array (FPGA), programmable logic array (PLA), solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

Systems, devices, and methods described herein may be implemented using a computer program product tangibly embodied in an information carrier, e.g., in a non-transitory machine-readable storage device, for execution by a programmable processor; and the method steps described herein, including for example one or more of the steps of FIGS. 2, 4, 7, and 8 may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Although the computing devices described herein (e.g., servers, cyber physical systems, virtual machines) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining or similar operations described herein may be performed by processing circuitry, which may process information by, for example, converting the obtained information into other information, comparing the obtained information, or converted information to information stored in the network node, and/or performing one or more operations based on the obtained information or converted information, and based on said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all the functionality described herein may be provided by processing circuitry executing instructions stored on in memory, which in certain embodiments may be a computer program product in the form of a non-transitory computer-readable storage medium. In alternative embodiments, some or all the functionalities may be provided by the processing circuitry without executing instructions stored on a separate or discrete device-readable storage medium, such as in a hard-wired manner. In any of those embodiments, whether executing instructions stored on a non-transitory computer-readable storage medium or not, the processing circuitry can be configured to perform the described functionality. The benefits provided by such functionality are not limited to the processing circuitry alone or to other components of the computing device but are enjoyed by the computing device, and/or by end users and a wireless network generally.

While certain illustrative embodiments are described herein, those embodiments are presented by way of example only, and not limitation. While the embodiments have been particularly shown and described, it will be understood that various changes in form and detail may be made. Although various embodiments have been described as having features and/or combinations of components, other embodiments are possible having a combination of any features and/or components from any of embodiments as discussed above.

What is claimed is:

1. A computer-implemented method for training an adversarial neural network to simulate a stealthy blind false data injection attack on a cyber physical system, the method comprising:
    using supervised learning to generate an initial attack vector, by an adversarial attack generation model, based on inferred grid topology and historical measurements, the adversarial attack generation model generating a mapping representing the inferred grid topology and the adversarial neural network being trained by the adversarial attack generation model, with a subset of historical measurements as input and all historical measurements as output;
    determining, by an adversarial verification model, a substitute bad data detection threshold by obtaining pseudo-estimated measurements from the adversarial neural network utilizing the subset of the historical measurements as input;
    generating a final attack vector, by the adversarial verification model, based on a filtered subset of the initial attack vector utilizing the substitute bad data detection threshold, the final attack vector enabling of a counter measure, the final attack vector including malicious data and the counter measure including storing final attack vectors in a security catalog for security purposes;
    classifying, by the adversarial verification model, data in the initial attack vector into abnormal data and malicious data; and
    generating and sending updated security parameters to the cyber physical system based on the counter measure.

2. The method of claim 1, wherein the historical measurements include one or more of voltage angle, magnitudes, active power flows, reactive power flows, and generated power.

3. The method of claim 1, further comprising selecting input data, by the adversarial attack generation model, for training the adversarial neural network, the selected input data including a subset of the historical measurements based on a state to be estimated for the cyber physical system.

4. The method of claim 1, further comprising selecting input data, by the adversarial attack generation model, for training the adversarial neural network, the selected input data including a subset of the historical measurements, wherein the subset includes voltage angles and magnitudes.

5. The method of claim 1, further comprising generating, by the adversarial attack generation model, intended state deviation using a random gaussian distribution.

6. The method of claim 1, further comprising using supervised learning, by the adversarial attack generation model, to generate the initial attack vector, wherein input data for training the adversarial neural network includes a subset of the historical data and an intended state deviation.

7. The method of claim 1, wherein the adversarial neural network comprises four layers.

8. The method of claim 1, wherein the adversarial neural network utilizes a Tan-Sigmoid activation function to infer grid topology.

9. The method of claim 1, wherein determining the substitute bad data detection comprises:
    determining the filtered subset of the initial attack vector by filtering the initial attack vector utilizing the substitute bad data detection threshold.

10. The method of claim 1, wherein determining the substitute bad data detection threshold comprises obtaining pseudo-estimated measurements from the adversarial neural network utilizing a subset of the historical measurements as input.

11. The method of claim 1, wherein determining the substitute bad data detection threshold comprises obtaining an error vector determined by a difference between the historical measurements and the pseudo-estimated measurements.

12. The method of claim 1, wherein determining the substitute bad data detection threshold comprises setting a scalar factor for adjusting filtering strength.

13. The method of claim 1, further comprising filtering, by the adversarial verification model, the initial attack vector utilizing a substitute bad data detection threshold and a normalized residual vector.

14. The method of claim 1, wherein the counter measure is based on at least one of a signature detection mechanism, an anomaly detection mechanism, and an intrusion detection mechanism.

15. A non-transitory computer readable medium or media containing instructions for executing a method for training an adversarial neural network to simulate a stealthy blind false data injection attack on a cyber physical system, the method comprising:

using supervised learning to generate an initial attack vector, by an adversarial attack generation model, based on inferred grid topology and historical measurements, the adversarial attack generation model generating a mapping representing the inferred grid topology and the adversarial neural network being trained by the adversarial attack generation model, with a subset of historical measurements as input and all historical measurements as output;

determining, by an adversarial verification model, a substitute bad data detection threshold by obtaining pseudo-estimated measurements from the adversarial neural network utilizing the subset of the historical measurements as input;

generating a final attack vector, by the adversarial verification model, based on a filtered subset of the initial attack vector utilizing the substitute bad data detection threshold, the final attack vector enabling creation of a counter measure, the final attack vector including malicious data and the counter measure including storing final attack vectors in a security cataloge for security purposes;

classifying, by the adversarial verification model, data in the initial attack vector into abnormal data and malicious data; and generating and sending updated security parameters to the cyber physical system based on the counter measure.

16. A system for training an adversarial neural network to simulate a stealthy blind false data injection attack on a cyber physical system, the system comprising:

a database connected to a network, configured for receiving and storing historical measurements and attack vectors; and one or more processors and memory, the memory containing instructions executable by the one or more processors whereby the system is operative to:

use supervised learning to generate an initial attack vector, by an adversarial attack generation model, based on inferred grid topology and historical measurements, the adversarial attack generation model generating a mapping representing the inferred grid topology and the adversarial neural network being trained by the adversarial attack generation model, with a subset of historical measurements as input and all historical measurements as output;

determine, by the adversarial verification model, a substitute bad data detection threshold by obtaining pseudo-estimated measurements from the adversarial neural network utilizing the subset of the historical measurements as input; and generate a final attack vector, by the adversarial verification model, based on a filtered subset of the initial attack vector utilizing the substitute bad data detection threshold, the final attack vector enabling creation of a counter measure, the final attack vector including malicious data and wherein the counter measure includes storing final attack vectors in a security catalog for security purposes;

classify, by the adversarial verification model, data in the initial attack vector into abnormal data and malicious data; and generate and sending updated security parameters to the cyber physical system based on the counter measure.

17. The system of claim 16, wherein implementing the counter measure is based on at least one of a signature detection mechanism, an anomaly detection mechanism, and an intrusion detection mechanism.

18. The system of claim 16, further comprising generating and sending updates for the adversarial attack generation model.

19. The system of claim 16, further comprising generating and sending updates for the adversarial verification model.

20. The system of claim 16, further comprising training the adversarial neural network with the classified data.

\* \* \* \* \*